United States Patent
Knas et al.

(10) Patent No.: US 10,592,586 B1
(45) Date of Patent: Mar. 17, 2020

(54) SYSTEMS AND METHODS FOR IMPROVING WORKFLOW EFFICIENCY AND FOR ELECTRONIC RECORD POPULATION

(71) Applicant: MASSACHUSETTS MUTUAL LIFE INSURANCE COMPANY, Springfield, MA (US)

(72) Inventors: Michal Knas, Monson, MA (US); Jiby John, Suffield, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

(21) Appl. No.: 15/466,728

(22) Filed: Mar. 22, 2017

Related U.S. Application Data

(60) Provisional application No. 62/311,543, filed on Mar. 22, 2016.

(51) Int. Cl.
*G06F 17/21* (2006.01)
*G06F 17/24* (2006.01)
*H04L 29/06* (2006.01)
*G06Q 30/02* (2012.01)

(52) U.S. Cl.
CPC .......... *G06F 17/212* (2013.01); *G06F 17/243* (2013.01); *H04L 67/42* (2013.01); *G06Q 30/02* (2013.01)

(58) Field of Classification Search
CPC ...... G06F 17/243; G06F 17/212; G06F 3/017; G06F 3/0484; G06F 3/0485; G06F 3/04883; G06F 3/04888; H04L 65/4069; G06B 15/02; G06Q 30/02
See application file for complete search history.

(56) References Cited

U.S. PATENT DOCUMENTS

| | | | |
|---|---|---|---|
| 7,786,975 B2 | 8/2010 | Ording et al. | |
| 7,913,184 B1 * | 3/2011 | Zhang | G06F 17/243 715/224 |
| 9,734,135 B2 * | 8/2017 | Swinehart | G06F 3/04812 |
| 2005/0041858 A1 * | 2/2005 | Celi, Jr. | G06F 17/30905 382/173 |
| 2006/0256133 A1 | 11/2006 | Rosenberg | |
| 2007/0006098 A1 | 1/2007 | Krumm et al. | |
| 2009/0221279 A1 | 9/2009 | Rutledge | |
| 2010/0161409 A1 | 6/2010 | Ryu et al. | |
| 2012/0256967 A1 | 10/2012 | Baldwin et al. | |
| 2012/0265977 A1 | 10/2012 | Ewell, Jr. et al. | |
| 2013/0205189 A1 * | 8/2013 | DiPierro | G06F 3/0483 715/224 |

(Continued)

OTHER PUBLICATIONS

Oscar de Brujin et al., "Rapid Serial Visual Presentation: A space-time trade-off in information presentation", Imperial College of Science, Technology & Medicine. Department of Electrical and Electronic Engineering, 2000.

*Primary Examiner* — Quoc A Tran
(74) *Attorney, Agent, or Firm* — Eric L. Sophir; Dentons US LLP

(57) ABSTRACT

Server and client methods and systems for improving efficiency, accuracy and speed for inputting data from a variety of sources into an electronic form in a continuously streaming manner. More specifically, the present disclosure relates to client/server system and methods for continuous streaming and scrolling of re-organized forms to improve speed, accuracy and efficiency of electronic form population.

17 Claims, 14 Drawing Sheets

(56) References Cited

U.S. PATENT DOCUMENTS

| | | |
|---|---|---|
| 2014/0019167 A1 | 1/2014 | Cheng et al. |
| 2014/0045477 A1 | 2/2014 | Ewell, Jr. et al. |
| 2014/0089801 A1 | 3/2014 | Agrawal |
| 2014/0210863 A1 | 7/2014 | Osaka |
| 2014/0359647 A1 | 12/2014 | Shoemake et al. |
| 2015/0086072 A1 | 3/2015 | Kompalli et al. |
| 2015/0099480 A1 | 4/2015 | Reiter |
| 2015/0205494 A1 | 7/2015 | Scott et al. |
| 2015/0234457 A1 | 8/2015 | Kempinski |
| 2015/0245084 A1 | 8/2015 | Downing et al. |
| 2015/0347903 A1 | 12/2015 | Saxena et al. |
| 2015/0370435 A1 | 12/2015 | Kirmse et al. |
| 2016/0132530 A1 | 5/2016 | Misu et al. |
| 2016/0162478 A1 | 6/2016 | Blassin et al. |
| 2016/0189423 A1 | 6/2016 | Kaeser et al. |
| 2016/0225012 A1 | 8/2016 | Ha et al. |
| 2017/0188168 A1 | 6/2017 | Lyren et al. |
| 2017/0210288 A1 | 7/2017 | Briggs et al. |

\* cited by examiner

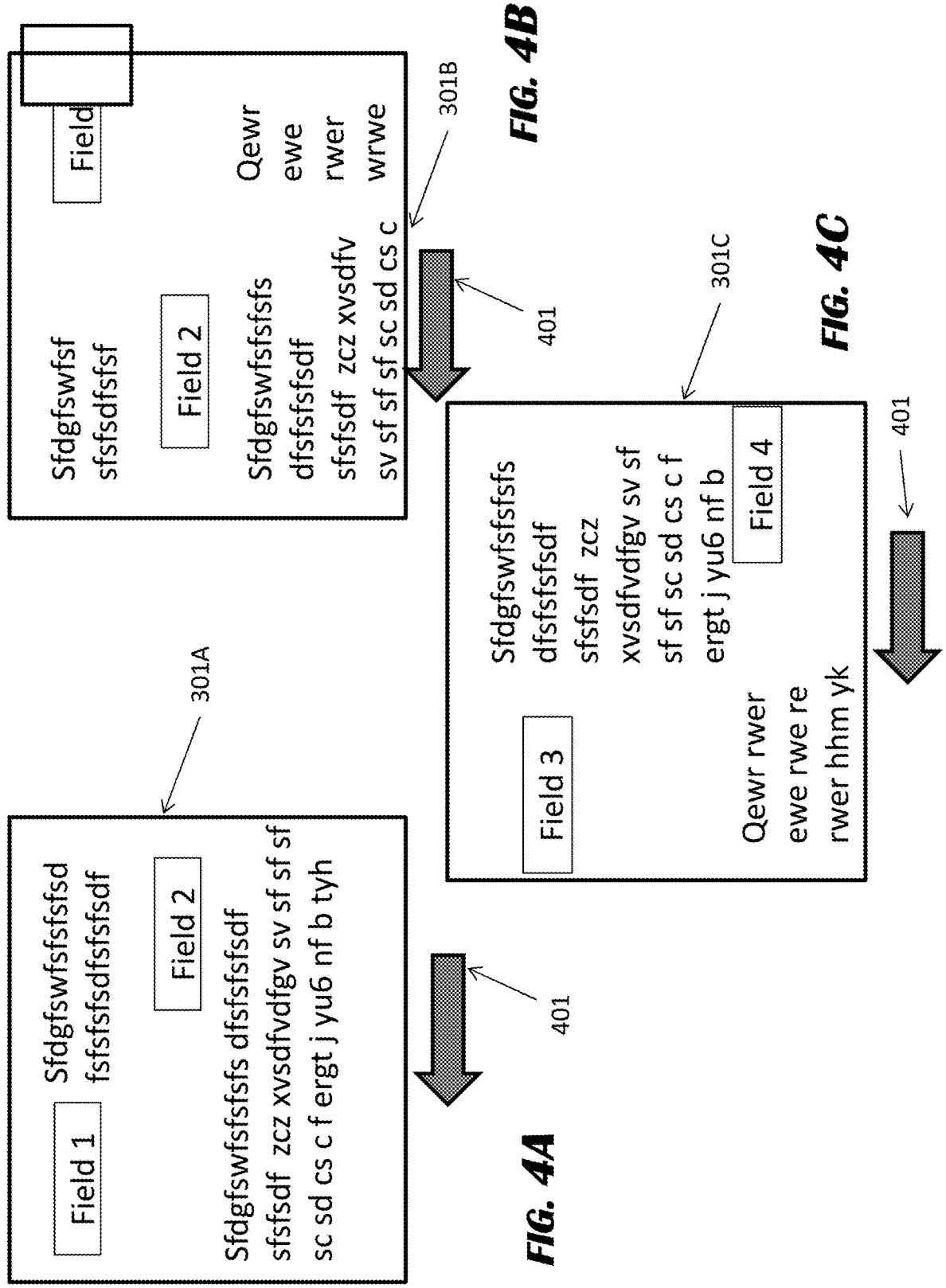

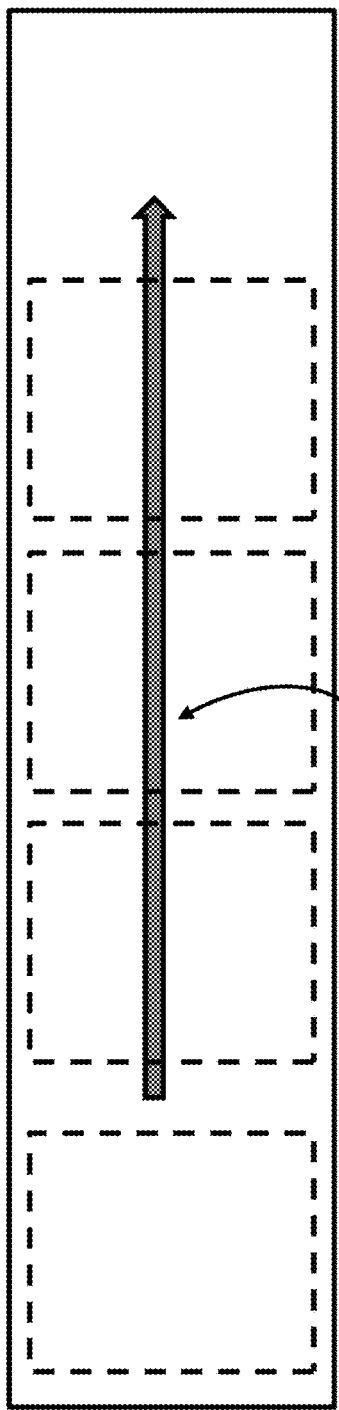
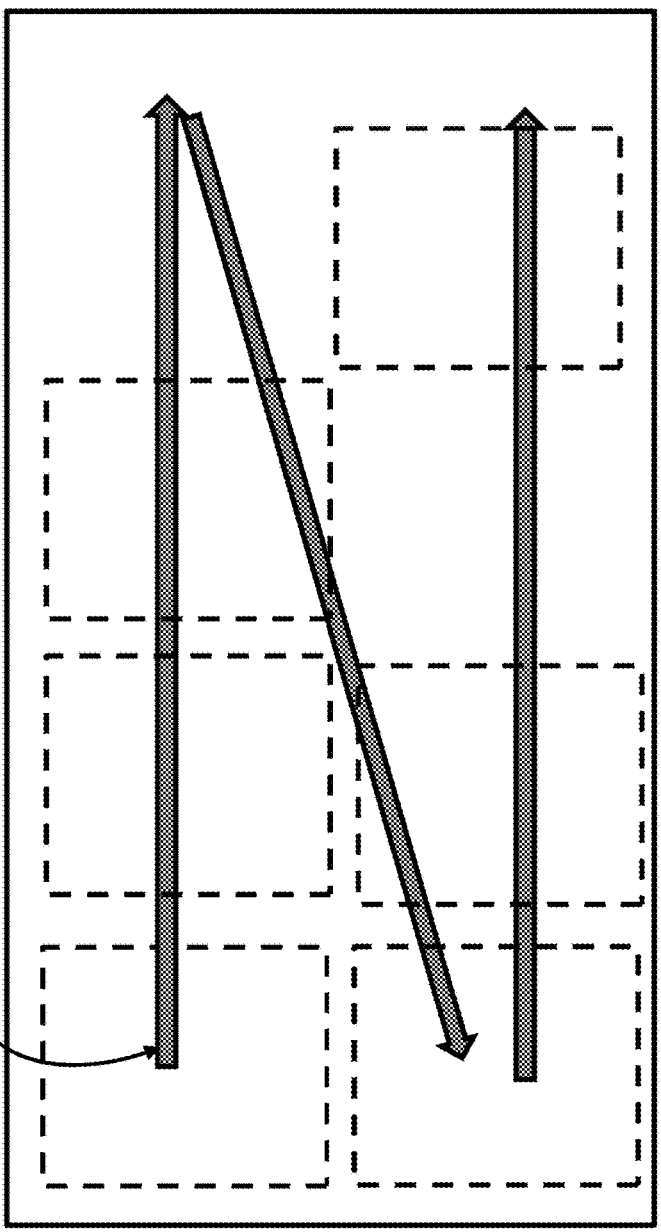
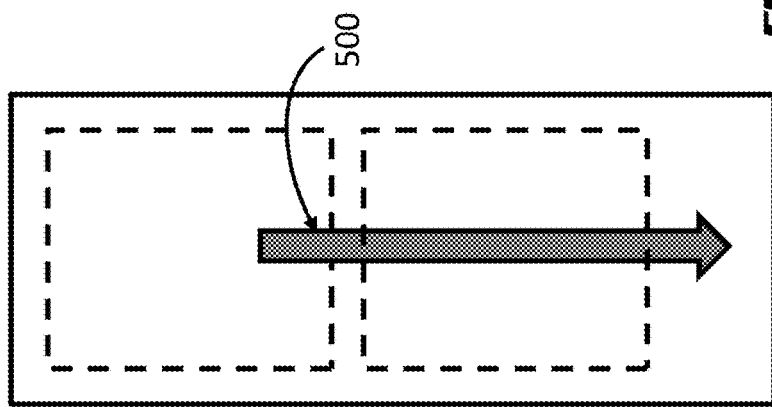
FIG. 5A
FIG. 5B
FIG. 5C

SYSTEMS AND METHODS FOR IMPROVING WORKFLOW EFFICIENCY AND FOR ELECTRONIC RECORD POPULATION

CROSS-REFERENCE TO RELATED APPLICATIONS

This application claims the benefit of U.S. Provisional Application No. 62/311,543, filed on Mar. 22, 2016, which is incorporated herein by reference in its entirety.

FIELD OF THE DISCLOSURE

The present disclosure relates in general to systems and methods for increasing workflow efficiency and improving electronic records population. More specifically, the present disclosure relates to client/server systems and methods for increasing workflow efficiency and improving electronic records population in a data gathering and data entry field utilizing continuous workflow input algorithms and load balancing between networked devices.

BACKGROUND

The size and amount of data collected, maintained, and input continues to grow and expand exponentially as more and more records are maintained in electronic format. Records may include health records, application data, such as for insurance purposes; financial data; property records; or any other type of stored electronic data.

Electronically stored data may be input directly as scanned documents or may be input into databases or electronic forms. Such data may need to be maintained in its original native format and may also need to be compiled into a form or electronic record, such as a life insurance application or underwriting policy. Input data may be gathered from a single source in a single format or may need to be gathered from a number of disparate sources in different formats. Data may include but is not limited to medical test results, question and answer forms, and publicly available records. A problem occurs when trying to input this disparate data into a single form in a timely and efficient manner because a single operator may need to be pulled from task to task or entry screen to entry screen to complete a single record. For example, a record comprising medical information may require the input operator to switch from one data entry form or source to another depending on the format and type of data being entered. Such switching and transitioning from task to task creates work flow inefficiency which results in errors, slower then acceptable data entry times, and expertise inefficiencies. Accordingly, a need exists for a system and method that allows for increased accuracy, workflow improvement and expertise in the population of electronic forms in a continuous manner.

Additionally, gathered information may need to be entered and compiled into a single form. The information may be of such volume that the form size exceeds the operators display screen size. To enter the data, the operator has to enter data on the visible screen and then scroll up or down on the form or from left to right on the form to enter the remaining data. In forms that are very large, the additional scrolling and manual movement of the form causes input inefficiencies, errors, and loss of productivity. Accordingly, a need exists for a system and method that allows for increased efficiency and workflow improvement in the population of electronic forms by allowing for continuous input without interruption.

As will be appreciated by those skilled in the art, the input of data on a continuous streaming and scrolling form cannot be performed by a human and is not something that existed prior to computer implementation. It is not possible for a human operator using a pen and a paper form to input and complete fields in a continuous scrolling manner without stopping the form to complete the fields in a discrete manner. Data input in a paper form is a series of discrete tasks performed in sequence. It is not a continuous streaming flow of data input.

SUMMARY

Methods and systems of the present disclosure include a method for increasing data input and efficiency in a client/server network comprising: receiving, via an input device coupled to a processor running an application, a memory, and a display with a display area, a selection of an electronic form comprising a plurality of input fields, from an electronic form repository; loading, the electronic form into a volatile memory of the client server network; determining, via the application running on the processor, that the electronic form has an associated viewable area that is larger than the display area; automatically segmenting, via the processor, the selected electronic form into a series of segments corresponding in size to the display area; streaming to the display of the input device from the volatile memory, the series of segments of the electronic form in a continuous stream; receiving inputs associated with the plurality of input fields during the streaming utilizing the input device; after receiving the inputs associated with the plurality of input fields, continuously storing the inputs associated with the plurality of input fields as part of the electronic form in the volatile memory; and saving the stored inputs as part of the electronic form once the series of segments of the electronic form have been streamed and the receipt of inputs for the plurality of input fields is complete.

In an embodiment, the streaming form appears to be moving in a horizontal direction. In another embodiment, the streaming form appears to be moving in a vertical direction. In another embodiment the reorganizing of the portions being streamed in an order based on a criteria. In another embodiment the rate of streaming increases or decreases based on the inputting. In an embodiment, an electronic record or form on a screen moves horizontally in a continuous manner so that a user can complete the fields of the form or input information much like an object on an assembly line. In an embodiment, the record or form will be loaded into volatile memory and will proceed to be displayed to an operator at a predetermined rate such that the operator will attempt to input data at the prescribed rate. In an embodiment, the horizontal movement will be dictated by the input of data, ensuring complete data entry before any automatic movement. In an embodiment, the display screen may preview the upcoming document or may place the current working document in context among several other displayed documents. In an embodiment, the scrolling document will maintain a constant pace while in another embodiment, the document will attempt to scroll at an ever increasing pace as long as the operator is able to complete the form. In an embodiment, the scrolling record document may automatically pause when the operator ceases inputting data. In another embodiment, the document record may automatically resume when the operator resumes input. In an embodiment, an application loaded into RAM controls the display of the form also stored in RAM. In an embodiment, the display is scrolled from RAM in a continuous manner and displayed to the user in a continuous manner.

In an embodiment, the input fields automatically transition to the next field within the viewable record as the form scrolls in a horizontal direction. In an embodiment, the input fields automatically transition to the next field within the viewable record in a vertical direction as the form scrolls. In an embodiment, the electronic record is automatically organized to accept operator input data in a manner corresponding to a hardcopy of the record in a horizontal or vertical orientation. In an embodiment, the user may control the pace of the record scroll with a voice command, a visual command, a gesture, a biosensor movement or an input device. In an embodiment, the pace of the record scroll is controlled by an algorithm.

In an embodiment, the fields of the form or electronic document are completed by a plurality of operators. In an embodiment, each of the plurality of operators is an expert on a specific potion of the form. In an embodiment, each form is completed sequentially, by a plurality of operators. In an embodiment, the selection of operators for the plurality of operators is selected based on individual operator parameters or objective criteria.

In an embodiment, the operator's movements are monitored to control the movement of the form, including stopping the movement, pausing the movement, continuing the movement, slowing the speed movement, increasing the speed the movement, or the like. In an embodiment, the operator's eye movements control the movement of the form. In an embodiment, the operator's head movements control the movement of the form. In an embodiment, the operator's hand movements control the movement of the form. In an embodiment, the operator's gestures control the movement of the form.

In an embodiment, a plurality of operators have discreet systems networked together allowing them to operate as users on an assembly line. In this embodiment, the form, which is stored in a centralized memory location, will pass from a first system to a second discreet system down the line. In an embodiment, the form will appear to move horizontally across the screen as though on a conveyer belt. In an embodiment, the systems do not require to be physically in proximity to each other but may be distributed across a network. In an embodiment, work completed by an operator may be buffered prior to distribution to a next operator. In an embodiment, each operator works at their own respective speed and workflow is buffered between operators. In an embodiment, a centralized repository of RAM temporarily stores the form and form segments and allows them to be scrolled out to a specific operator in a continuous manner.

In an embodiment, head movements, eye tracking, or gestures, controls the work flow and speed of the document scrolling on the screen. In an embodiment head movements, eye tracking, or gestures can change or vary the speed and flow of the document segments. In an embodiment, if an operator looks away from the screen, it can slow down or pause the screen. In another embodiment, if the operator makes a head gesture the work flow scroll speed can vary. In another embodiment, if the operator focuses on a specific location or point on the display, the speed of the work flow scroll may vary. In an embodiment, certain areas of the display are associated with specific command instructions which control the characteristics of the work flow scroll, such that when the operator looks or focuses on such areas, the work flow responds accordingly.

In one embodiment, a method for increasing data input and efficiency in a client server network comprises receiving, via an input device coupled to a processor executing an application, a memory, and a display with a display area, a selection of an electronic form comprising a plurality of input fields, from an electronic form data store, whereby the electronic form is loaded into a volatile memory of the client server network; determining, via the application executed by the processor, that the electronic form has an associated viewable area that is larger than the display area; automatically segmenting, via the application executed by the processor, the selected electronic form into a series of segments corresponding in size to the display area; streaming, via the application executed by the processor, to the display of the input device from the volatile memory, the series of segments of the electronic form in a continuous stream in a direction from a left side of the display to a right side of the display, wherein the series of segments are available to receive input associated with the plurality of input fields as the series of segments stream across the display; receiving, via the application executed by the processor, inputs associated with the plurality of input fields during the streaming utilizing the input device; and upon receiving the inputs associated with the plurality of input fields, continuously storing, via the application executed by the processor, the inputs associated with the plurality of input fields as part of the electronic form in the volatile memory.

In another embodiment, a method for increasing data input by a plurality of operator input devices in a networked environment comprises receiving, by one of a plurality of networked operator input devices, via a selector device coupled to a processor of the operator input device executing an application, a selection for an electronic form comprising a plurality of input fields, from an electronic form data store, the electronic form comprising a plurality of input fields, each of the networked operator input devices comprising a processor executing an application and a display having a display area; loading, by one of the plurality of networked operator input devices, the selected electronic form into the electronic form data store accessible by the plurality of operator input devices; determining, by one of the plurality of networked operator input devices, that the electronic form has an associated viewable area that is larger than the display areas of the plurality of the networked operator input devices; segmenting, by one of the plurality of networked operator input devices, the selected electronic form into a series of segments corresponding in size to the display areas of the plurality of networked operator input devices to which the segments are to be streamed; simultaneously streaming by one of the plurality of networked operator input devices, to at least one of the plurality of networked operator input devices from the memory, the series of segments of the electronic form in a continuous stream in a direction from a left side of the display area to a right side of the display area, wherein the series of segments are available to receive input associated with the plurality of input fields as the series of segments stream across the display area; and when each segment of the series of segments approaches the right side of the display area of a networked operator input device, streaming, by another one of the plurality of networked operator input devices, each segment from a left side of the display area, wherein each segment is available to receive input associated with the plurality of input fields as the series of segments stream across the display area.

In yet another embodiment, a method for increasing data input by a plurality of operator input devices assigned to a plurality of operators using intelligent input devices in a networked environment comprises collecting, by an operator input device, gesture data sensed by the tracking module of the operator input device, the operator input device being one of a plurality of networked operator input devices, each operator input device comprising a processor executing an application, a display having a display area, and the tracking module; receiving, by the operator input device, via a selector device coupled to the processor of the operator input device, a selection for an electronic form comprising a plurality of input fields, from an electronic form data store of the networked operator input devices, whereby the selected electronic form is loaded into the electronic form data store accessible by the plurality of networked operator input devices, whereby the electronic form is simultaneously streamed to the plurality of networked operator input devices in a continuous stream; upon determining, by the operator input device, that the electronic form has an associated viewable area that is larger than the display area of the operator input device, segmenting, by the operator input device, the selected electronic form into a series of segments corresponding in size to the display area of the operator input device to which the segments are to be streamed; during a stream of the selected electronic form on the display of the operator input device and while the electronic form is displayed as moving from a first side of the display to a second side of the display, determining, by the operator input device, whether the gesture data provides instructions for manipulating the display of the electronic form on the operator input device; and pausing, by the operator input device, the stream of the electronic form on the display of the operator input device when the instructions for manipulating the display based on the gesture data indicate that an operator associated with the operator input device is looking away from the display.

In another embodiment, a system for increasing data input by a plurality of operator input devices assigned to a plurality of operators using intelligent input devices in a networked environment comprises a network; an electronic form data store communicatively coupled to the network; a plurality of operator input devices communicatively coupled to the network; each operator input device comprising a processor executing an application, a display having a display area, a selector device, and a tracking module; each operator input device configured to: collect gesture data sensed by the tracking module of the operator input device, receive via the selector device coupled to the processor of the operator input device, a selection for an electronic form comprising a plurality of input fields, from the electronic form repository, whereby the selected electronic form is loaded into the electronic form data store accessible by the plurality of networked operator input devices, whereby the electronic form is simultaneously streamed to the plurality of networked operator input devices in a continuous stream; upon determining that the electronic form has an associated viewable area that is larger than the display area of the operator input device, segment the selected electronic form into a series of segments corresponding in size to the display area of the operator input device to which the segments are to be streamed; during a stream of the selected electronic form on the display of the operator input device and while the electronic form is displayed as moving from a first side of the display to a second side of the display, determine whether the gesture data provides instructions for manipulating the display of the electronic form on the operator input device; and pause the stream of the electronic form on the display of the operator input device when the instructions for manipulating the display based on the gesture data indicate that an operator associated with the operator input device is looking away from the display.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIGS. 4A-4C are a series of segments of the form of FIG. 3 parsed into a continuous string of horizontal forms, according to an embodiment of the present disclosure.

FIG. 5A-5C is an illustration of segmented form scroll options in accordance with the present disclosure.

DETAILED DESCRIPTION

Figure 1:
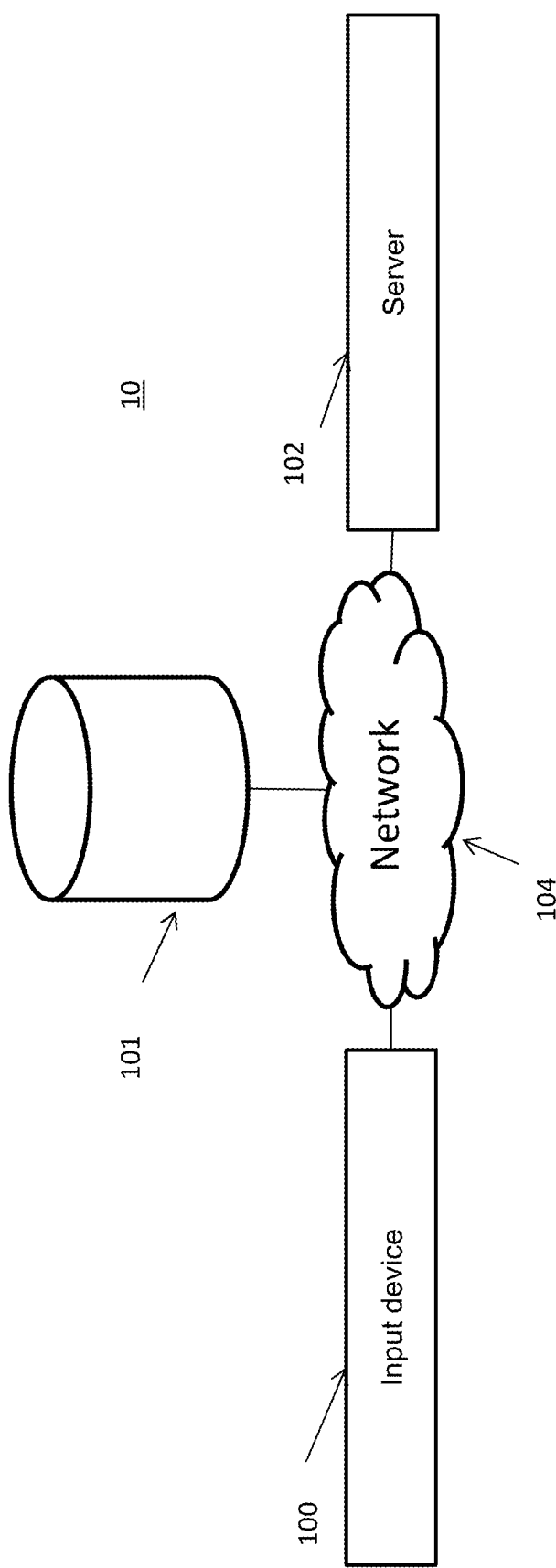
FIG. 1 is a block diagram illustrating the system, according to an embodiment of the present disclosure.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Systems and methods for controlling work flow input into forms and analyzing, partitioning, segmenting, streaming, inputting, and saving of data and forms are disclosed. The disclosed systems and methods may be implemented by users in interaction with computer systems. In one or more embodiments, the computer systems may include a data input engine which may include any number of software tools running on any number of computing devices where the computing devices may communicate using any network infrastructure. Examples of computing devices may include personal computers, tablet devices, and mobile phones, among others. Examples of network infrastructures may include intranets, personal networks, local area networks (LAN), wide area networks (WAN) such as the internet, storage area networks (SAN), virtual private networks (VPN), wired or wireless networks, and the world wide web, amongst others.

FIG. 1 shows an example embodiment of a network environment according to the present disclosure. An environment 10 includes a network 104, a user or operator input device 100, a database 101, and a server 102.

Network 104 includes a plurality of nodes, such as a collection of computers and/or other hardware interconnected by communication channels, which allow for sharing of resources and/or information. Such interconnection can be direct and/or indirect. Network 104 can be wired and/or wireless. Network 104 can allow for communication over short and/or long distances. Network 104 can operate via at least one network protocol, such as Ethernet, a Transmission Control Protocol (TCP)/Internet Protocol (IP), and so forth. Network 104 can have any scale, such as a personal area network, a local area network, a home area network, a storage area network, a campus area network, a backbone network, a metropolitan area network, a wide area network, an enterprise private network, a virtual private network, a virtual network, a satellite network, a computer cloud network, an internetwork, a cellular network, and so forth. Network 104 can be and/or include an intranet and/or an extranet. Network 104 can be and/or include Internet. Network 104 can include other networks and/or allow for communication with other networks, whether sub-networks and/or distinct networks, whether identical and/or different from network 104. Network 104 can include hardware, such as a network interface card, a repeater, a hub, a bridge, a switch and/or a firewall. Network 104 can be operated, directly and/or indirectly, by and/or on behalf of one and/or more entities, irrespective of any relation to Input device 100, database 101, and/or Forms data server 102.

Operator Input device 100 operates a computer, which can be a hardware and/or software server, a workstation, a desktop, a laptop, a tablet, a mobile phone, a mainframe, a supercomputer, a server farm, and so forth. The computer can be operated, directly and/or indirectly, by and/or on behalf of a user of input device 100. The computer can be touchscreen and/or non-touchscreen. The computer can include and/or be part of another computer system and/or cloud network. The computer can run any type of operating system (OS), such as iOS™, Windows™, Android™, Unix™, Linux™ and/or others. The computer can include and/or be coupled to a mouse, a keyboard, a camera, whether forward-facing and/or back-facing, an accelerometer, a touchscreen, and/or a microphone, and/or an output device, such as a display, a speaker, and/or a printer. The computer is in communication with network 104, such as directly and/or indirectly. Such communication can be via a software application, a mobile app, a browser, an OS, and/or any combination thereof. The computer can include circuitry for global positioning determination, such as via a global positioning system (GPS), a signal triangulation system, and so forth. The computer can be equipped with near-field-communication (NFC) circuitry.

Database 101 can be a hardware and/or software server stored on a computer, a workstation, a desktop, a laptop, a tablet, a mobile phone, a mainframe, a supercomputer, a server farm, and so forth. The server can be operated, directly and/or indirectly, by and/or on behalf of Database 101. The computer can be touchscreen and/or non-touchscreen. The computer can include and/or be part of another computer system and/or cloud network. The computer can run any type of OS, such as iOS™, Windows™, Android™, Unix™, Linux™ and/or others. The computer can include and/or be coupled to an input device, such as a mouse, a keyboard, a camera, whether forward-facing and/or back-facing, an accelerometer, a touchscreen, and/or a microphone, and/or an output device, such as a display, a speaker, and/or a printer. The computer is in communication with network 104, such as directly and/or indirectly. Such communication can be via a software application, a mobile app, a browser, an OS, and/or any combination thereof. The computer can include circuitry for global positioning determination, such as via GPS, a signal triangulation system, and so forth. The database 101 can be a relational database, a flat file, an organized database a series of databases and may contains user and/or account information, medical records, financial records, personnel records, criminal records, tax records, and any other historical records. Database 101 may be implemented in standard memory or volatile or non-volatile memory.

Server 102 operates a computer, which can be a hardware and/or software server, a workstation, a desktop, a laptop, a tablet, a mobile phone, a mainframe, a supercomputer, a server farm, and so forth. The computer can be operated, directly and/or indirectly, by and/or on behalf of a user. The computer can be touchscreen and/or non-touchscreen. The computer can include and/or be part of another computer system and/or cloud network. The computer can run any type of OS, such as iOS™, Windows™' Android™, Unix™, Linux™ and/or others. The computer can include and/or be coupled to an input device, such as a mouse, a keyboard, a camera, whether forward-facing and/or back-facing, an accelerometer, a touchscreen, and/or a microphone, and/or an output device, such as a display, a speaker, and/or a printer. The computer is in communication with network 104, such as directly and/or indirectly. Such communication can be via a software application, a mobile app, a browser, an OS, and/or any combination thereof. The computer can include circuitry for global positioning determination, such as via GPS, a signal triangulation system, and so forth. The computer can run a database, such as a relational database, which contains user information.

Input device 100 is in communication with network 104, such as direct, indirect, encrypted, unencrypted, and others. Input device 100 is in selective communication, such as direct, indirect, encrypted, unencrypted, and others, with at least one of the database 101 and/or the server 102 via network 104.

Input device 100 can be associated with a user and/or a legal entity, such as an organization, a company, a partnership, and/or others. Database 101 is in communication with network 104, such as direct, indirect, encrypted, unencrypted, and others. Database 101 is in selective communication, such as direct, indirect, encrypted, unencrypted, and others, with at least one of input device 100 and server 102 via network 104. The Database may also be a server or series of servers or an application or series of applications running autonomously on computers or servers.

Server 102 is in communication with network 104, such as direct, indirect, encrypted, unencrypted, and others.

Server 102 is in selective communication, such as direct, indirect, encrypted, unencrypted, and others, with at least one of input device 100 and database 101 via network 104.

Figure 2:
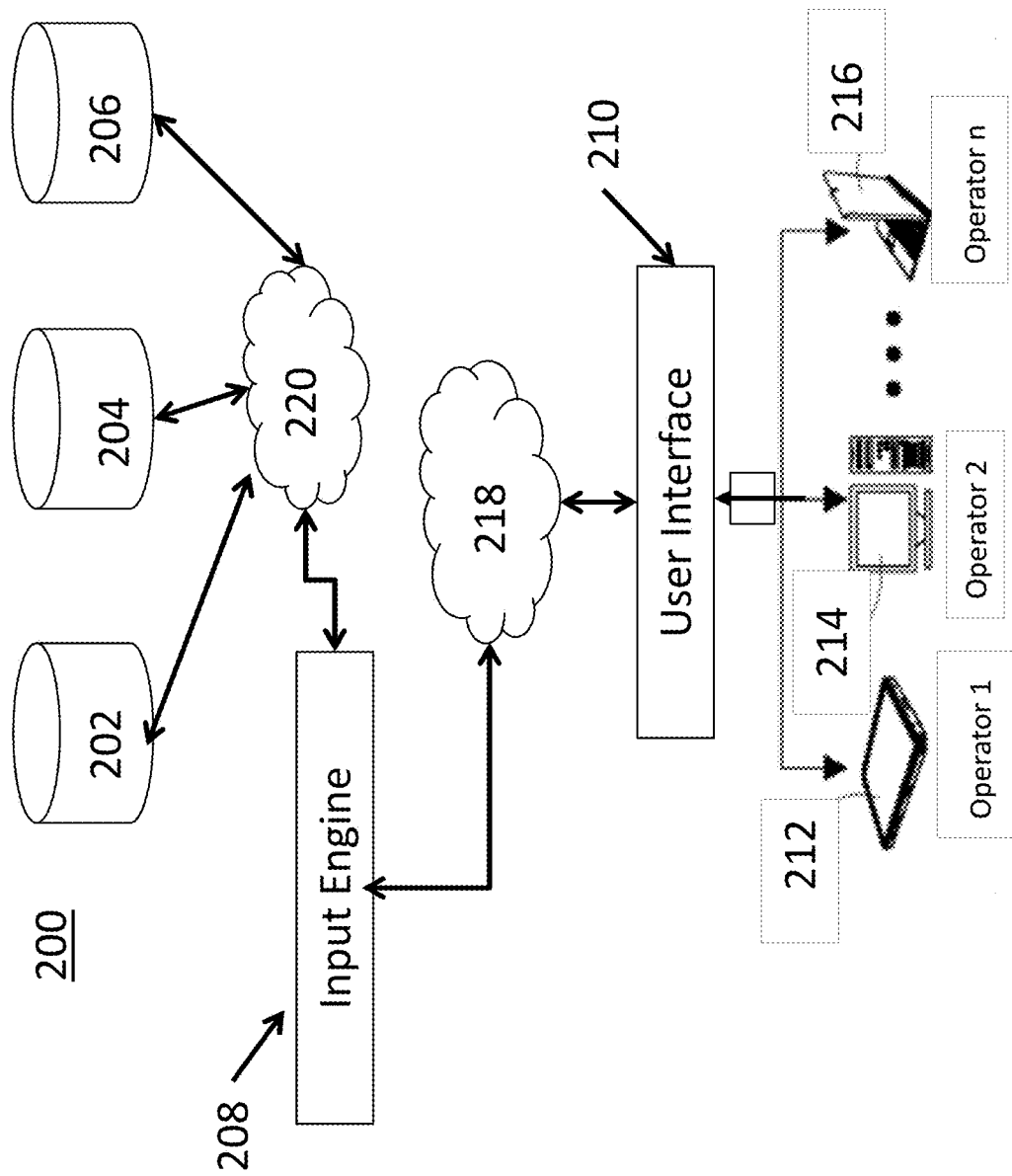
FIG. 2 is a block diagram illustrating the main components of the systems and methods for inputting data in electronic forms according to an embodiment of the present disclosure.

FIG. 2 is a block diagram illustrating a system architecture for a data input system, according to an embodiment. In FIG. 2, data input system 200 may include database or memory 202, database or memory 204, database or memory 206, input engine 208, user interface 210, operator devices 212, 214, and 216, and communication networks 218 and 220. Data input system 200 may additionally include one or more of servers (not shown in FIG. 2) having the necessary hardware and software to implement any of the aforementioned system components that require implementation via such necessary hardware and software, among others. It should be understood that data input system 200 can include less components, more components, or different components depending on the desired analysis goals.

In some embodiments, databases or memories 202, 204 and 206 are implemented as a single database or as a series of databases stored on a server (not shown) using database management systems (DBMS). Examples of such DBMS include MySQL, PostgreSQL, SQLite, Microsoft SQL Server, Microsoft Access, Oracle, SAP, dBASE, FoxPro, IBM DB2, LibreOffice Base, FileMaker Pro and any other type of database that organizes collections of data. In an embodiment, 202, 204 and 206 may be any standard memory device or storage, including volatile and non-volatile. Examples of non-volatile memory are flash memory, ROM, PROM, EPROM and EEPROM memory. Volatile memory such as dynamic RAM, DRAM, fast CPU cache memory (static RAM, SRAM). In an embodiments, data input engine 208 is implemented as computer hardware and software including any number of components required for running a desired set of applications, including any number of processors, random access memory modules, physical storage drives, wired communication ports, wireless communication ports, and the like. In these embodiments, data input engine 208 is a computer software package that manages form segmentation, continuous scrolling of forms, temporary storage of form segments, and data input and storage. In an embodiment, data input engine 208 may be implemented on a thin client server or a local computer. In an embodiment, data input engine 208 is resident in RAM or other transient memory. In an embodiment, data input engine 208 may run from a centralized repository of RAM. In an embodiment data input engine 208 may be accessed simultaneously by multiple users.

In some embodiments, databases or memories 202, 204, and 206 store information related to users, entities, products, or any other type of data stored in a database. In these embodiments, the information stored within database 202-206 may be derived from internal and/or external sources. In an embodiment, database 206 may constitute a database that comprises combinations and compilations of data stored in other databases 202-204. In another embodiment, databases or memories 202, 204, and 206 store forms and/or data. It is to be understood that databases 202, 204 and 206 may be physically unique and separate databases or memories or may be parts of a single physical database or memory. In another embodiment, databases or memories 202, 204, and 206 may be a shared cache of RAM.

In some embodiments, users may interact with system 200 via operator devices 212-216. Operators 1-$n$ may interact with one or more components within system architecture 200 via user interface 210. Examples of such computing devices include personal computers, tablet devices, workstations, input terminals, and mobile phones, amongst others. In other embodiments, user interface 210 is configured to allow users 212-216 to interact with data input engine 208 in accordance with methods of the present disclosure. In an embodiment, a selected form may be chosen from database 202 and stored in RAM by data input engine 208. In an embodiment, an application or client may also be stored in or by data input engine 208 or may be stored in the operator's input device 212-216. Once a form is resident in memory, data input engine 208 may prepare the form for scrolling by segmenting the form based on a display parameter. Once formatted the form is streamed to operator input device 212. In this manner, the segmented form may continuously flow across the user's display. As the form scrolls, each field may be populated by the operator. Field selection may occur based on any number of parameters such as a prior field is completed. Fields may be populated based on a hierarchical criteria. Fields may be populated consecutively and automatically directed to the next field on related fields or fields may be populated based on position, relative to the top of the display, bottom of the display, leading edge or trailing edge of the display. As will be appreciated by those skilled in the art, the order and priority for populating the series of displayed fields will vary based on the form content and layout.

As the form scrolls on the operator's display, the input data may be saved back into the associated RAM locations or may be directed to an alternative temporary storage location such as an associated input record. As the first form segment completes, the second segment will be streamed to the operators display in a seamless transition between segments. In an embodiment, a message to the operator indicating the progress or other criteria may be inserted between segments. Other content may include, words of encouragement, instructions to speed up, a daily log or record, or any other information. Once the form is complete, and all the fields are input, the form, populated with data, may be saved in memory as any standard file type.

In another embodiment, the segmented form may be simultaneously allocated by data input engine 208 to multiple operators 212-216, where each operator is tasked with inputting data only into a specific segment. In such an embodiment, data input engine 208 acts as the central repository and houses RAM for the segmentation and storage of the segmented form. In an embodiment of the multi-operator, the segmented forms may scroll continuously across the displays of the different operators, wherein each operator is displaying a different portion of the form at the same time. In this manner, operator 1 may be tasked with completing fields 1-20 and operator 2, fields 21-30, etc. As the form begins to scroll, operator 2 may not see any form until operator 1 has completed fields 1-20. Once operator 1 completes fields 1-20, either a new form begins or operator 1's task is complete. Once operator 1 completes fields 1-20, the segmented form is streamed onto operator 2's display where operator 2 begins to input fields 21-30. In an embodiment, the system can dynamically monitor the completion of the fields in each segmented form. The streaming to operator 2 can occur automatically as the fields in the previous segment are completed by operator 1 or can occur in response to an operator command. Additionally, and/or alternatively, operator 1 and 2 see the form simultaneously, but operator 2 can not input data into the segment intended for operator 1. Operator 2's portion would therefore become "live" only when segment 2 (fields 21-30) are displayed on the screen. Like streaming, operator 2's portion can be become live automatically as fields in operator 1's portion are completed, or it may become live in response to an operator's command. Additionally, and/or alternatively, in an embodiment, once an operator has completed their assigned segment, a new form is presented for completion. It will be understood, therefore that an operator can not move on to the next form unless and until the prior operator completes their segment of the assigned form.

Figure 3:
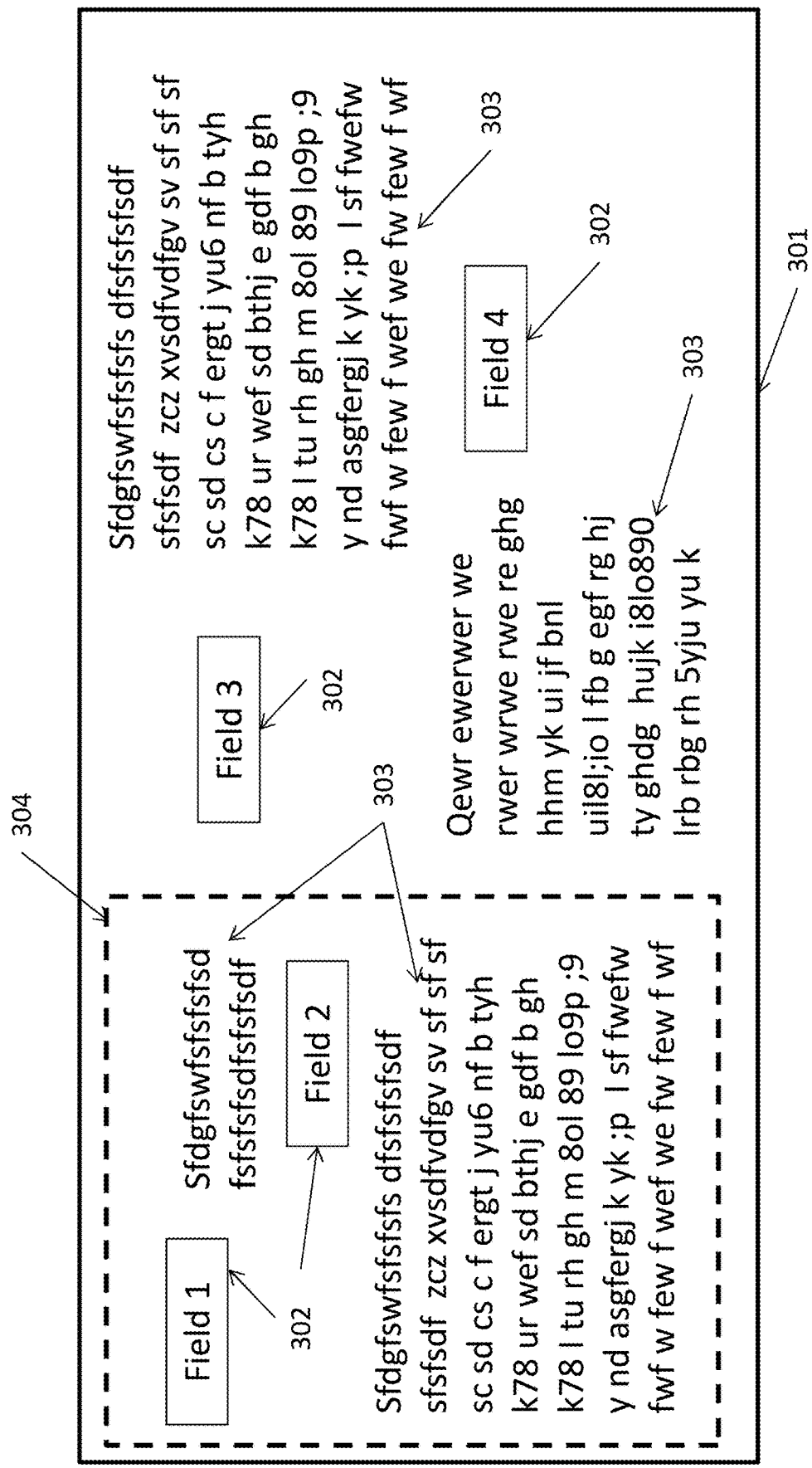
FIG. 3 is an exemplary form, according to an embodiment of the present disclosure.

FIG. 3 illustrates a typical electronic form in accordance to the present disclosure. Form 301 may comprises fields 302 and text areas 303. Form 301 may also comprise other non-active and interactive regions such as pictures, diagrams, graphs, charts, etc. Form 301 may comprise any number of fields 302 and text areas 303. Fields 302 my be text fields, data fields, alphanumeric fields, image fields or any other type field. Area 304 represents the displayable area for an operator device 212-214. As seen in FIG. 3, not all fields would be viewable to the operator as form 301 is larger than area 304. As illustrated, displayable area 304 may comprise fields 302 and text areas 303 as they appear on the form.

FIGS. 4A-4C represent the various portions of form 301 after segmentation in accordance with the present disclosure that an operator may see. In an embodiment, form 301, after being loaded into volatile memory such as RAM, is segmented based on the display size and other display related criteria into display size segments 301A-301C. In an embodiment, segmentation may also be based on the number or density of fields per segment. Once segmented, and stored in RAM, which allows almost simultaneous access to the segmented from. The segmented form is streamed to the operator's display in a continuous scroll. The streaming of the segments allows the data elements to be made available overtime in a sequential fashion, rather than in batch fashion.

Each segment 301A-C may comprises input fields. Beginning with segment 301A, the operator might fill in fields 1 and 2 as the display continuously scrolls in the direction of the arrow 401. As the segment scrolls from 301A to 301B to 301C, successive fields appear on the operator's display. An operator using operator input device 212-216 may complete the fields with the appropriate data until all successive fields are completed. In an embodiment, the segments continuously scroll at a pace adequate to allow the operator to input the data. In an embodiment, the segment scroll pauses from one segment to the next until all visible fields within the segment are completed. In another embodiment, all segments scroll vertically. In an embodiment, the segments scroll both horizontally and vertically to ensure complete coverage of the form. In an embodiment, the segments are realigned for the operator such that they appear to scroll either horizontally or vertically, regardless of the actual form orientation or layout.

In one embodiment where the segments appear to scroll horizontally, a segment appears on a left side of a display and moves to a right side of the display. A fully viewable segment may appear on the left side and move to the right side. Alternatively, a partially viewable segment may appear on the left side, then become fully viewable and continue to move to the right side. Although this embodiment recites a movement from left to right, it is intended that the segment can move from right to left, top to bottom, or bottom to top. As the segment streams across the display, the input fields of the segment are available for the operator to input into the input fields.

The networked operator input devices can synchronize the streaming amongst the networked operator input devices such that when the segment moves to the other side of the display, that segment is prompted to begin streaming on another networked operator input device, such that the inputs in the input fields of the segments displayed on the first networked operator input device are shown, indicated, or stored for the segments then displayed on the second networked operator input device. In order to synchronize the various operator input devices, the continuous stream of segments from one operator input device to another operator input device can comprise a set of instructions that identifies the next operator input device to display a particular segment after it is shown on a display of an operator input device.

FIGS. 5A-5C depict some embodiments of segmentation scroll movement through forms that exceed the viewable area of the operator's display. Arrows 500 depict the segmentation movement through a form. As will be appreciated by one skilled in the art, despite the physical attributes of a particular form, the appearance of movement to an operator may be same. In the example shown in FIG. 5A, a segment of the form moves from the left to the right. In the example shown in FIG. 5B, a segment of the form moves from the top to the bottom. In the example shown in FIG. 5C, the segment of the form moves from left to right in a top row, then moves from left to right in a bottom row. In each of these examples, additional segments may follow the segment if the segment does not utilize the entire display.

Figure 6:
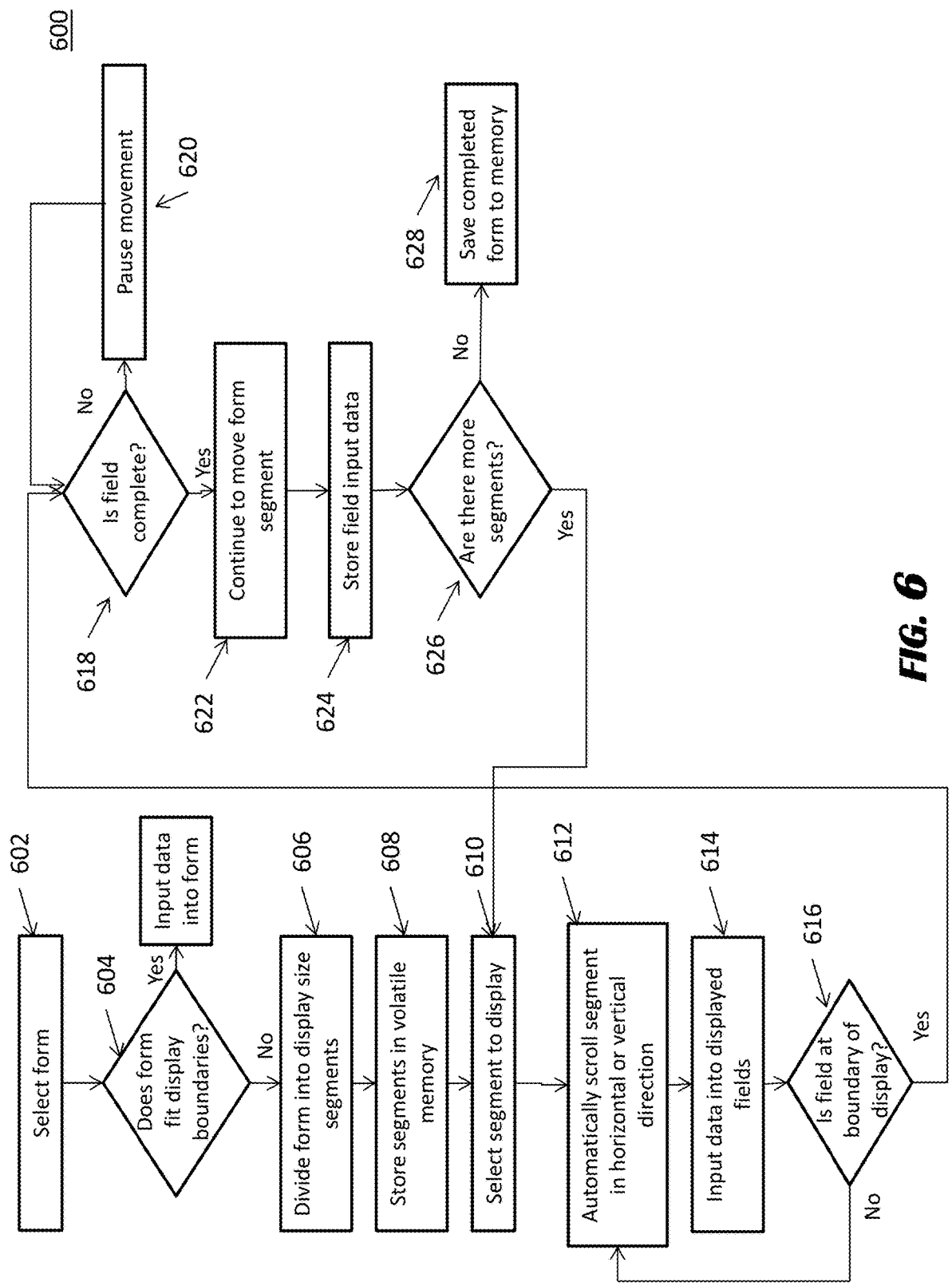
FIG. 6 is a flow diagram of an embodiment for scrolling and completing an electronic form according to an embodiment of the present disclosure.

FIG. 6 illustrates an embodiment 600 for a single operator input into a segmented form in accordance with the present disclosure. At 602, the operator selects the appropriate form. At 604, if the form is such that it is completely displayable on the operator's display, the operator inputs the data. In an embodiment, the form is deemed not to fit the display if as shown (e.g., resized) on the screen the form becomes illegible, the fields cannot be populated, or the form extends beyond the displayable area. If at 604, the form does not fit the display, it is divided by the input data engine at 606 into segments based on criteria associated with the operator's display. Other criteria may also be used, such as operator's skill set and abilities, which may have been previously evaluated based on past input history; density of fields, complexity of fields, etc. Each segment can comprise a displayable area, and can include field and text areas as they appear on the form. At step 608, the form, which has previously been stored in volatile memory is readied for streaming. At step 610, the segment to be displayed and scrolled is selected and at 612 the segment is streamed to the operator's display in a horizontal or vertical direction. As will be appreciated by those skilled in the art, each segment may be associated with a generated reference number. Each segment may also not have been horizontally or vertically adjacent to the prior segment, but may nonetheless be displayed to the user as such. At step 614, the operator inputs the data into the fields as they are displayed. In an embodiment, the operators cursor automatically transitions from field to field as each one is completed. In another embodiment, the operator may control the input cursor location using a traditional input device such as a mouse, a track ball, a touch pad, a touch screen, or a stylus. In another embodiment the operator controls cursor position using a hand gesture, a head movement, an eye movement or some other input in conjunction with a sensor.

At step 616, as data input engine 208 manages the program, it determines if the field is at the display boundary. If at step 619 the filed reaches the display's boundary, and the field has been completed, then the segment continues to scroll. If however, at step 618 it is determined that a field has reached the boundary without being completed, then at step 620 the scrolling is paused so that the operator can complete the field. Once the empty field is completed, at step 622 the segment will continue to scroll. At step 624, the data is either written into the field and stored back in volatile memory or may be stored in a record within volatile memory with an identifier to a specific field. At step 626, data input engine 208 determines if there is a subsequent segment, and selects the next segment for scrolling. At step 628, the completed form may be saved as any known fled type, such as PDF, TIFF, or JPEG.

Figure 7:
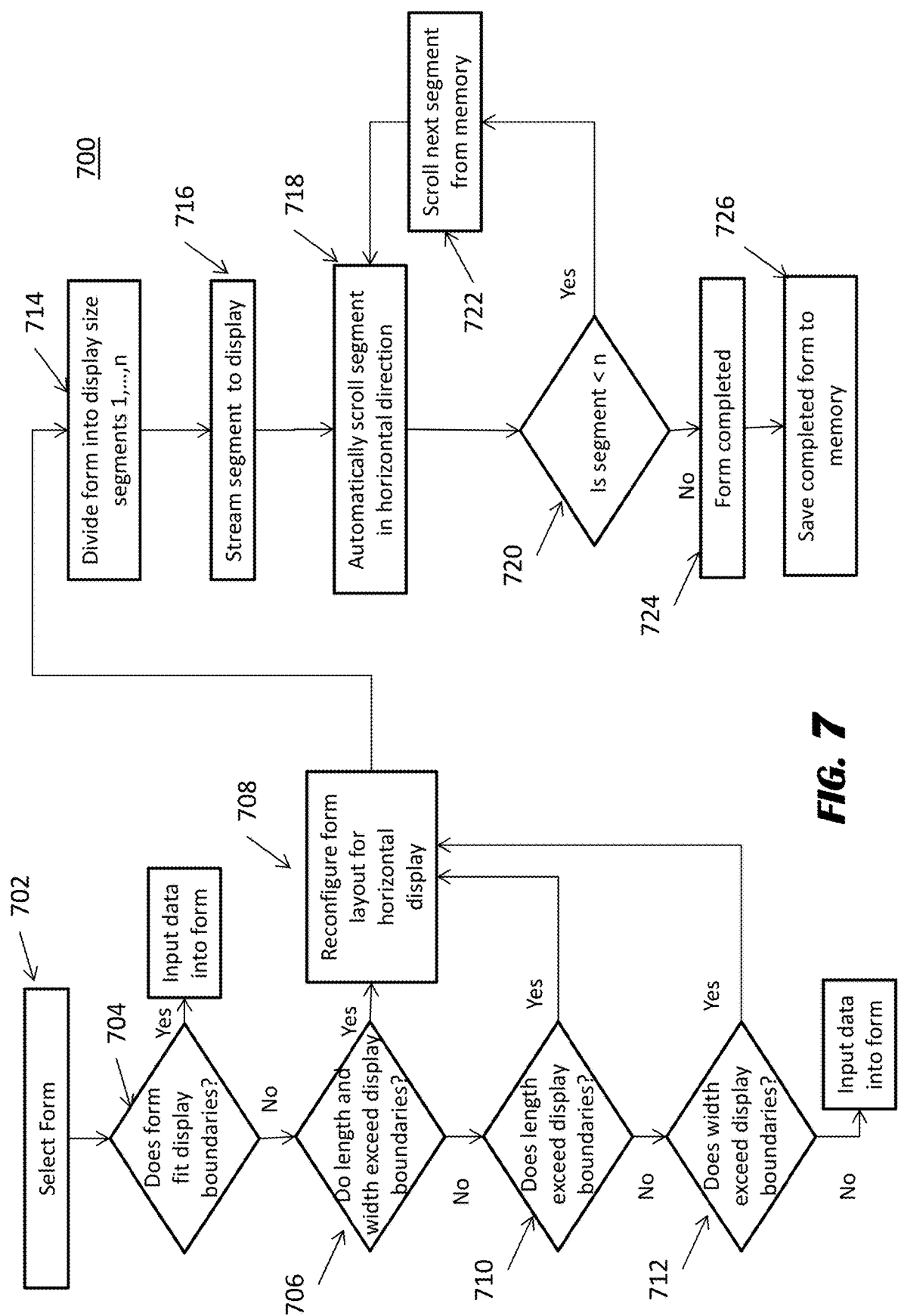
FIG. 7 is a flow diagram of an embodiment for scrolling and completing an electronic form according to an embodiment of the present disclosure.

FIG. 7 illustrates the steps for segmenting forms in accordance with an embodiment 700 of the present disclosure. At step 702, the operator selects the appropriate form. The form may be selected using a selection device, such as a mouse, keypad, keyboard, stylus, touchscreen, voice command, or the like. At 704, data input engine 208 determines if the form fits within the viewable region of the display. If the form exceed the display boundaries, then at step 706, the data input engine 208 determines if it is both the length of the form as well as the width of the form that exceeds the boundaries. If the form exceeds the display along both axis, then at step 708, the form is reconfigured for layout in a horizontal display. The reconfiguration is invisible to the operator but may be up and down in a column like fashion or from side to side as illustrated in FIG. 5. If the form exceeds the size in only one direction, then it is determined at steps 710 and 712 which direction exceeds the display parameters and the form is segmented accordingly at step 708. At step 714, the form is segmented into segments 1, . . . , n. At step 716 the first segment is streamed and automatically scrolls in the horizontal direction at step 718. At step 720, when the segment completes, if it is not the last segment, the next segment will stream at step 722. If it is the last segment, the form is completed at 724 and saved to memory at 726.

As will be appreciated by those skilled in the art, the form itself does not need to be physically segmented and stored as segments in memory, but it must be formatted to fit within the display parameters of the operator's display in a continuous scrolling fashion.

Figure 8:
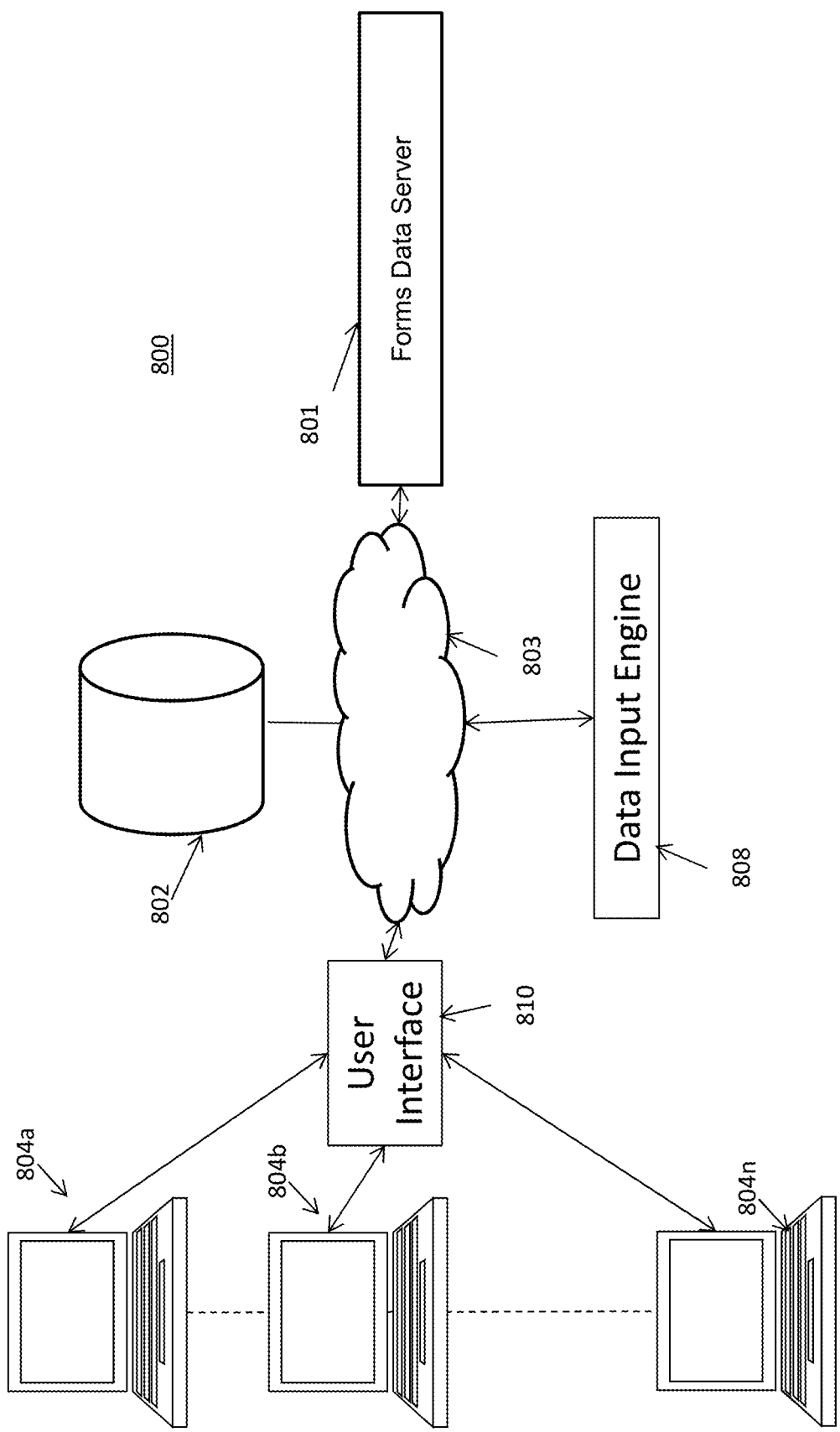
FIG. 8 is a block diagram illustrating the main components of an embodiment of the systems and methods for inputting data in scrolling electronic forms according to an embodiment of the present disclosure.

FIG. 8 illustrates a multi-operator system 800 in accordance with the present disclosure. System 800 comprises forms data server 801, memory 802, network 803, operator inputs devices 804*a-n*, data input engine 808 and user interface 810. Data server 801 may be a dedicated server for housing forms or may be part of a larger system or server used for multipurpose applications. Forms server 801 may also be part of the operator input device 804 or may be directly coupled to operator input devices 804. Memory 802 may be any volatile or non-volatile memory, although volatile memory that allows almost real time access to data from any memory location is required. Memory 802 may be a centralized reposition of RAM or other volatile memory. Memory 802 may be a stand alone system or may be part of a larger system or server including forms server 801. In an embodiment, memory 802 was coupled to network 803 and accessible to users 804. Network 803 may be any size network, including a LAN, WAN, intranet, extranet or the internet. Operator input devices 804*a-n* may be a simple input device or dumb input terminal coupled to a client or may be a standalone computer or server. Input devices 804*a-n* can be the same device or different devices. Data input engine 808 is implemented as computer hardware and software including any number of components required for running a desired set of applications, including any number of processors, random access memory modules, physical storage drives, wired communication ports, wireless communication ports, and the like. In these embodiments, data input engine 808 is a computer software package that manages form segmentation, continuous scrolling of form segments, temporary storage of form segments, and data input. In an embodiment, data input engine 808 may be implemented on a thin client server or a local computer. In an embodiment, data input engine 808 is resident in RAM or other transient memory. In an embodiment, data input engine 808 may run from a centralized repository of RAM. User interface 810 is configured to allow users 804*a-n* to interact with data input engine 808 in accordance with methods of the present disclosure.

Figure 9:
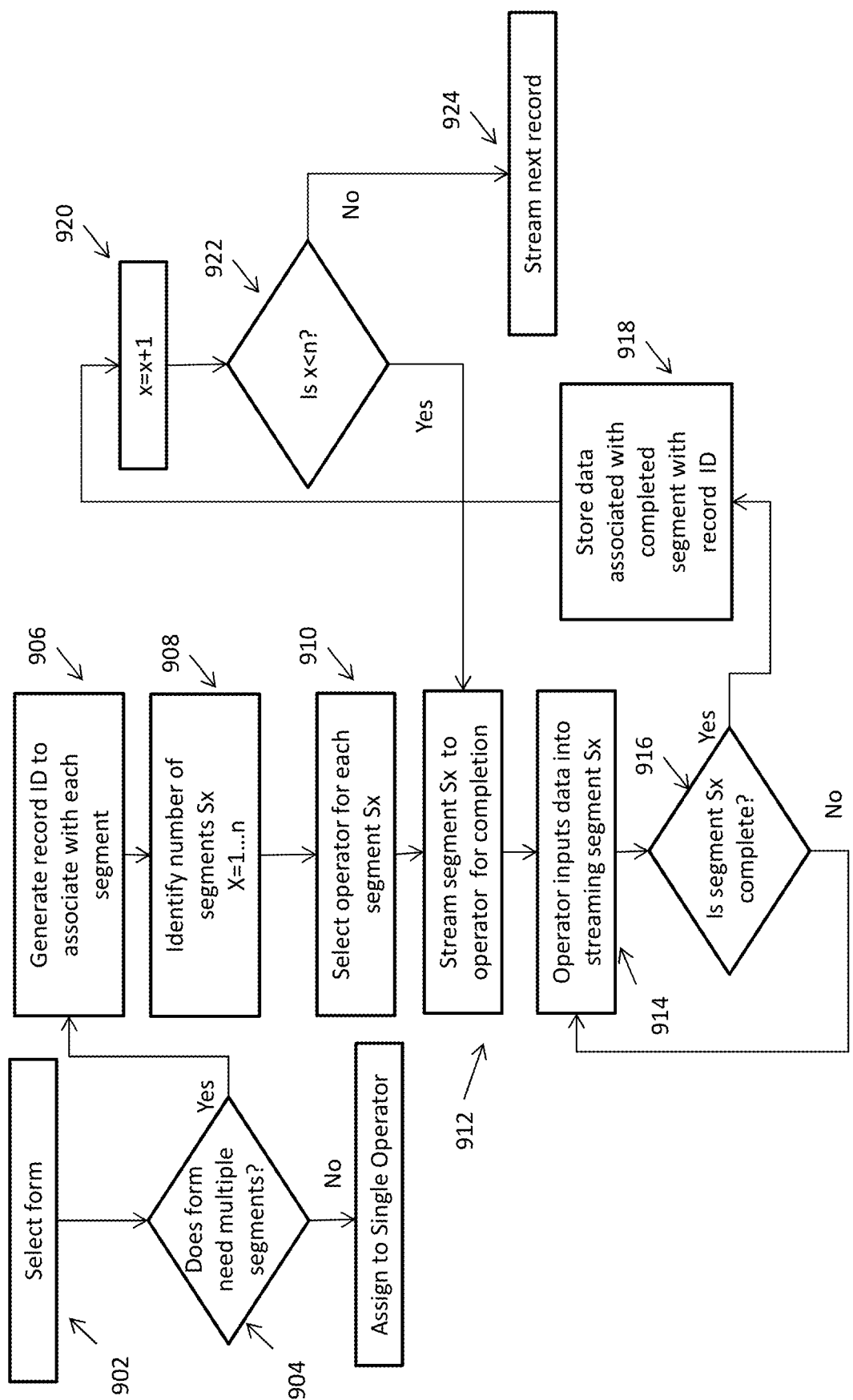
FIG. 9 is a flow diagram of an embodiment for scrolling and completing a scrolling electronic form according to an embodiment of the present disclosure.

FIG. 9 illustrates system 900 for using multiple operators to input data into a single form in a continuous flow. In an embodiment, multiple operators using user input devices 804*a-n* select a form. At step 904, it is determined that the form needs to be reformed as a series of multiple segments to be displayed in a continuous flow for the operators. In an embodiment, the continuous flow or scroll of the form appears on all operator devices simultaneously, despite the fact that each operator is responsible for only a portion of the form. In another embodiment, different form segments are streamed simultaneously to different operators. In yet another embodiment the form flows continuously from a first operator to a second operator when the first operator has completed his/her input. This is similar to an assembly line, wherein the operator at the second station receives a component only after the operator in the first station has completed their task. In this manner, the sequential flow of segments is managed by data input engine 808. As will be appreciated by those skilled in the art, because operators perform tasks at different rates, form segments may need to be buffered between operators to ensure that an operator does not lose data if the "assembly line" backs up. In an embodiment, at step 906, an ID is associated with each form segment. This allows for tracking of metric data as well as allows data input engine 808 to recompile the continuous form with the correct data. As a form segment is completed, the data will be repopulated into the form so that when the last operator completes their segment, the form is completed. As will be understood, the form streaming and the simultaneous streaming of different segments to different operators relies on the data stored in memory 802 and data input engine 808.

At step 908, data input engine 808 identifies the number of segment and at step 910 allocates a segment to a different operator or multiple segments to an operator. As will be understood, segment allocation may be based on a previously determined objective quality criteria, availability, skill, random or sequentially. In this way, data input engine 808 can maximize or optimize the form flow rate based on the available operators and their respective skill set. In an embodiment, segment assignment was dynamic and updateable even during the course of form streaming. At step 912, a segment of the form is streamed to each operator for completion.

At step 914, the operator assigned to a particular segment inputs the required data in the streaming field and at 916, data input engine 808 determines if the segment is complete. If the data input for a segment is complete, the data is stored at step 918 with the associated segment ID. The use of the segment IDs allows for the final compilation of the form. At step 920, a segment counter is incremented indicating that data input engine 808 is ready to stream the next segment. In an embodiment, this was done when individual operators had more then one assigned segment to complete. At step 922 the system determines if the form is complete and if it is, a new record with the same form may begin streaming at step 924 additionally and/or alternatively, the same record with a different form may be streamed.

Figure 10:
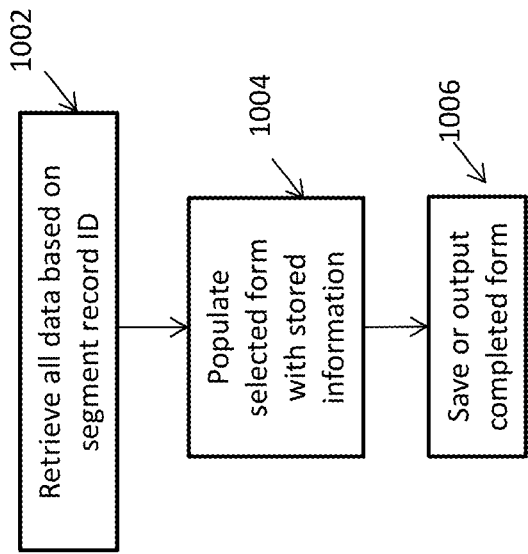
FIG. 10 is a block diagram showing the steps for assembling a form, according to an embodiment of the present disclosure.

FIG. 10 illustrates the compilation or population of the input data into the form for storage in a multi-operator environment. At 1002, all the previously input data is retrieved from the memory 802 based on the segment record ID. At 1004, the retrieved data is populated into the associated form and at step 1006, the form is saved in its final format. In an embodiment, the form is saved as jpeg, PDF, TIFF or any other standard file format. It is to be understood, that the form appears as a completed form and not simply as a data record.

Figure 11:
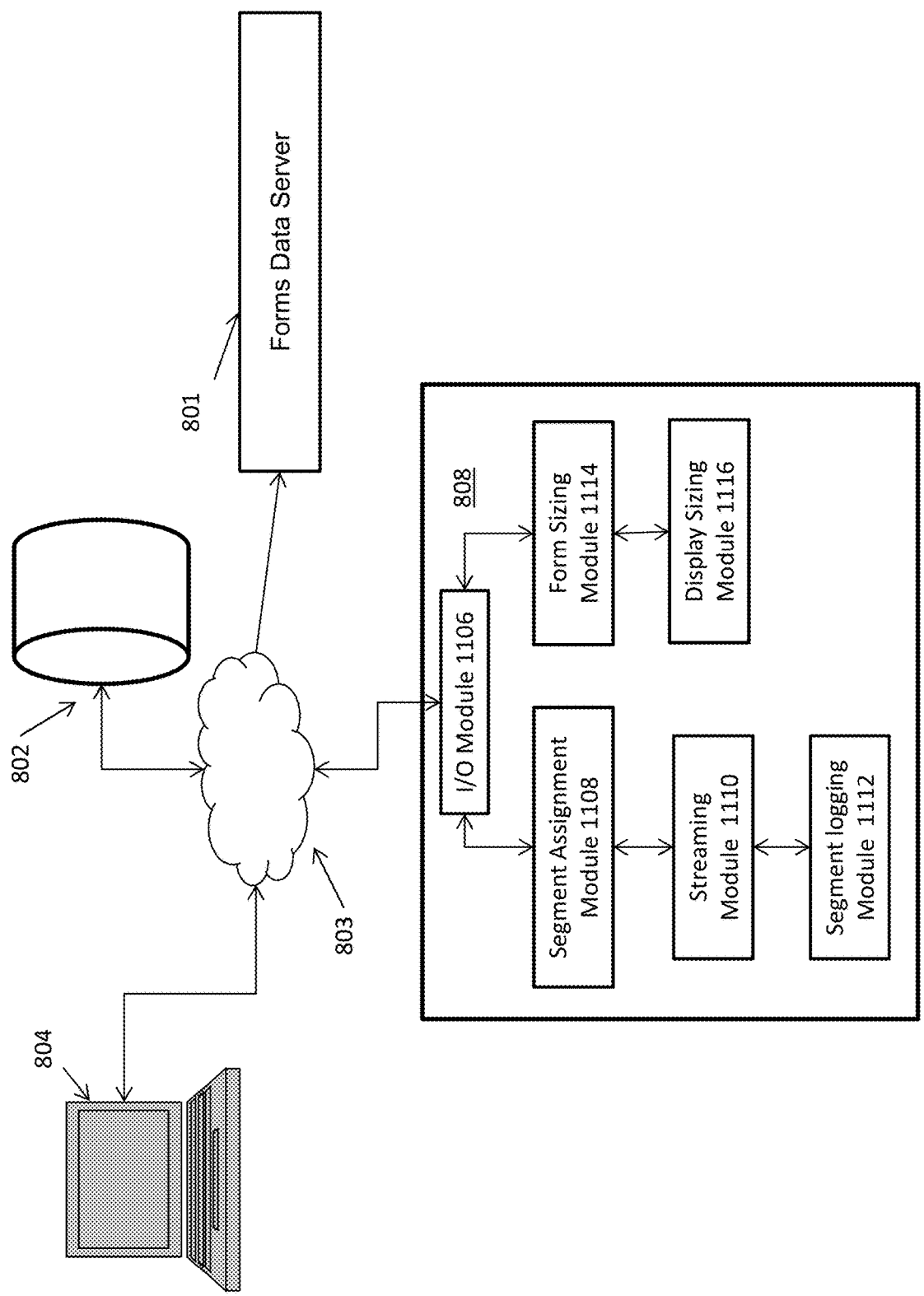
FIG. 11 is a block diagram of a data input engine in accordance with an embodiment of the present disclosure.

FIG. 11 depicts a system in accordance with the various embodiments of the present disclosure including data input engine 808. Data input engine 808 includes I/O module 1106 segment assignment module 1108, streaming module 1110, segment logging module 1112 form sizing module 1114 and display sizing module 1116. I/O module 1106 couples to network 803 to facilitate communications between operator input device 804 and data input engine 808. I/O module 1106 can facilitate any form of digital communications including, but not limited to packet, synchronous, asynchronous, parallel, serial, and over a wired or wireless connection. Once an operator selects the proper form, form sizing module 1114 determines if the form requires segmentation for display. Display sizing module, 1116 determines the maximum segment to display to a particular operator based on the operators input device 804. In an embodiment, if multiple operators are working on the same form, display sizing module 1116 must account for different display devices and segment the form accordingly. Segment assignment module 1108 may assign single or multiple segments to a single operator or a plurality of operators based on a criteria. The criteria may include availability, proficiency with a specific type of data, speed, etc. Streaming module 1110 controls the streaming of the segments to the various operators and may be able to manage multiple forms and operators simultaneously. Segment logging module 1112 may determine when segments are completed and may monitor operator performance and availability. It is to be understood more or less functions may be managed by the data input engine 808 and that data input engine 808 may be distributed on a single computer or server or across multiple computers or servers. Data input engine 808 may be implemented in hardware or software or a combination of both.

Figure 12:
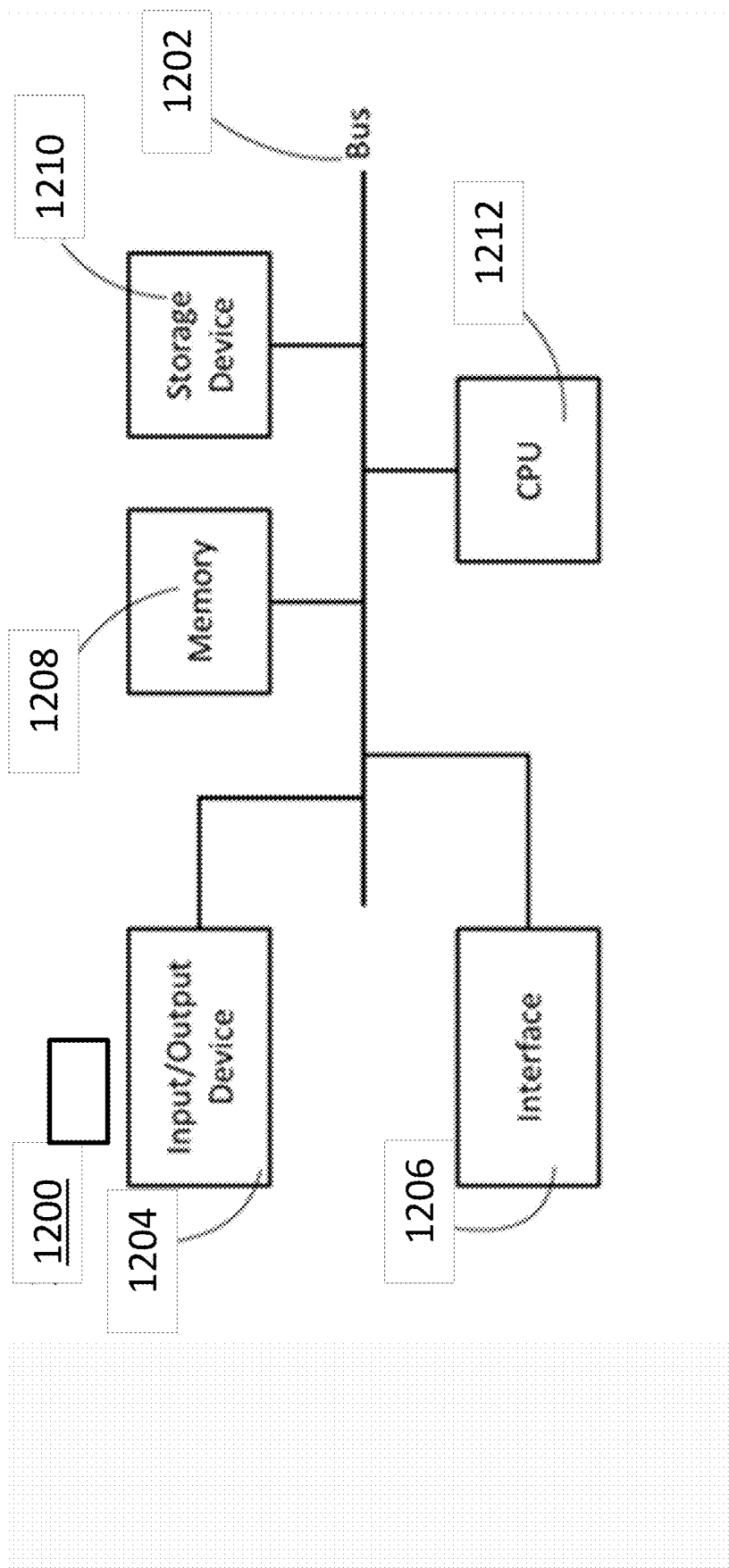
FIG. 12 is an illustration of an exemplary computing device in which one or more embodiments of the present disclosure may operate, according to an embodiment of the present disclosure.

FIG. 12 illustrates a computing device that may be used in the present system or method. In FIG. 12, bus 1202 is in physical communication with I/O device 1204, communication interface 1206, memory 1208, storage device 1210, and central processing unit 1212. Bus 1202 includes a path that permits components within computing device 1200 to communicate with each other. Examples of I/O device 1204 include peripherals and/or other mechanism that may enable a user to input information to computing device 1200, including a keyboard, computer mice, buttons, touch screens, voice recognition, and biometric mechanisms, and the like. I/O device 1004 also includes a mechanism that outputs information to the user of computing device 1000, such as, for example a display, a light emitting diode (LED), a printer, a speaker, and the like.

Examples of communication interface 1206 include mechanisms that enable computing device 1200 to communicate with other computing devices and/or systems through network connections. Examples of network connections include connections between computers, such as, for example intranets, local area networks (LANs), virtual private networks (VPNs), wide area networks (WANs), the Internet, and the like. Examples of memory 1208 include random access memory 1008 (RAM), read-only memory (ROM), flash memory, and the like. Examples of storage device 1210 include magnetic and/or optical recording medium, ferro-electric RAM (F-RAM) hard disks, solid-state drives, floppy disks, optical discs, and the like. In one embodiment, memory 1208 and storage device 1210 store information and instructions for execution by central processing unit 1212. In another embodiment, central processing unit 1212 includes a microprocessor, an application specific integrated circuit (ASIC), or a field programmable object array (FPOA), and the like. In this embodiment, central processing unit 1212 interprets and executes instructions retrieved from memory 1008 and storage device 1210.

According to some aspects of this embodiment, computing device 1200 is implemented as part of a server, and/or a data input engine, and the like. Examples of these implementations include servers, authorized computing devices, smartphones, desktop computers, laptop computers, tablet computers, PDAs, another type of processor-controlled device that may receive, process, transmit digital data, and the like. Additionally, computing device 1200 may perform certain operations that are required for the proper operation of system architecture or the data input engine. Computing devices 1200 may perform these operations in response to central processing unit 1212 executing software instructions contained in a computer-readable medium, such as memory 1208.

In one embodiment, the software instructions of components system architecture are read into memory 1208 from another memory location, such as storage device 1210, or from another computing device 1200 (e.g., a database, a memory and the like) via communication interface 1206. In this embodiment, the software instructions contained within memory 1208 instruct central processing unit 1212 to perform processes described in FIGS. 1-11. Alternatively, hardwired circuitry may be used in place of or in combination with software instructions to implement processes described herein. Thus, implementations described herein are not limited to any specific combination of hardware circuitry and software.

In an embodiment, operators may control the scroll of the forms or segmented form using gestures, ocular, head, and expressive feedback. Such operator feedback may me controlled by hand gestures, head movements, eye movements or other motions from the operator. In an embodiment, the motion may be controlled by simple speech commands. As will be understood, an operator may look to the next field and the system might monitor that eye movement to know that the operator is ready to fill in the next field. In another embodiment, the operator may gaze at a specific area of the display which is interpreted by the system as an instruction to speed up or slow down the scroll. In an embodiment, the system may be keyed to both eye and head movements for different instructions. Gross head movements may result in menu changes or form changes, whereas eye movements may control finer behavior like speed up or slow down. In an embodiment, hand gestures might be monitored, such as finger pointing, finger swiping, etc. All of these may be monitored by a camera or other optical device or sensor for interpretation by the system for instructions.

Figure 13:
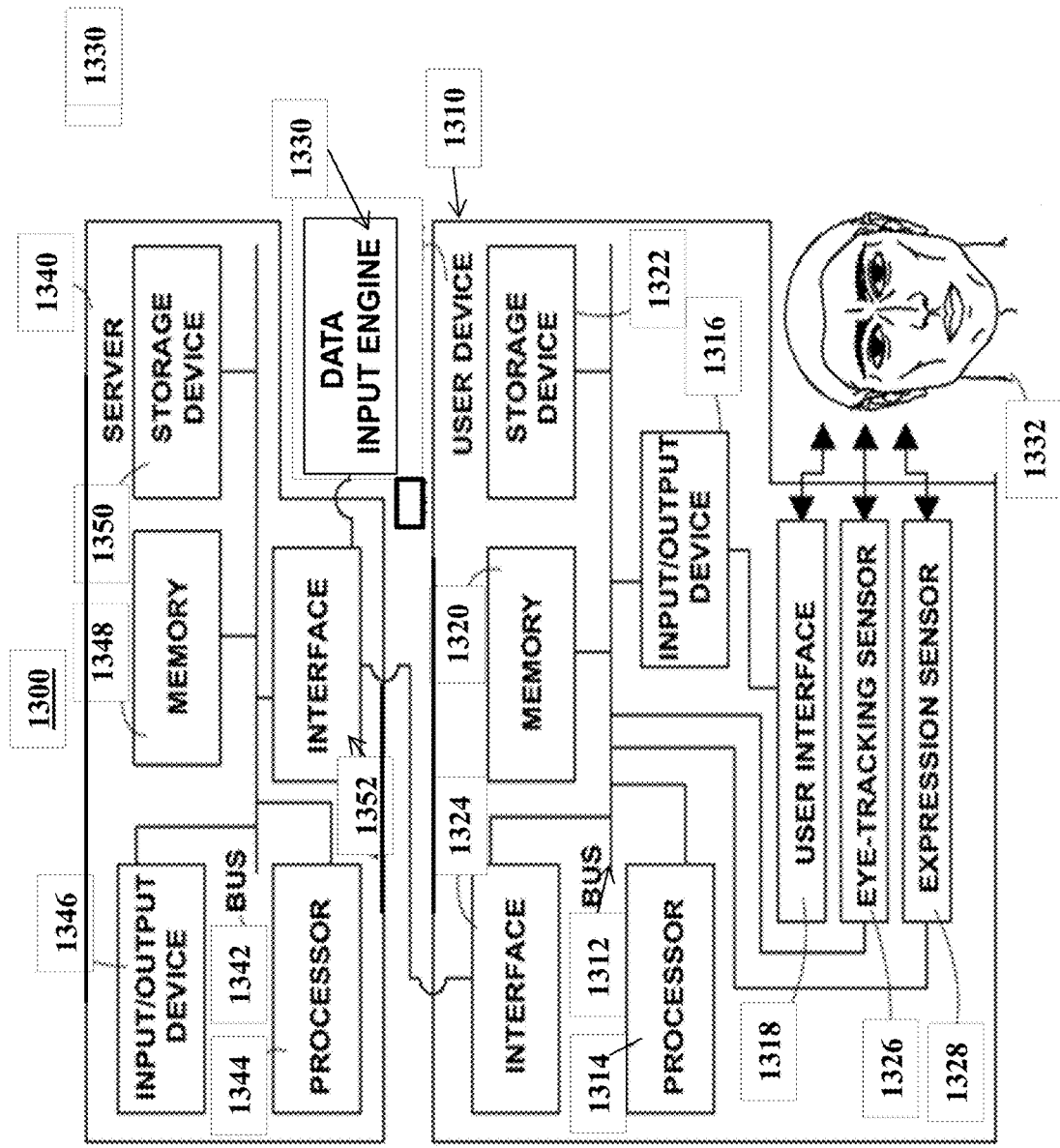
FIG. 13 is a block diagram of an embodiment of the present disclosure including a sensor control device.

FIG. 13 illustrates system hardware 1300 that may be used for gestures, ocular, head, and expressive feedback monitoring in accordance with the described embodiments. System 1300 for use in the present system includes user device 1310, external device 1330, such as the data input engine of the present invention, user 1332, and server 1340 which may be the forms server, or may house the data input engine. User device 1310 further includes user device bus 1312, processor 1314, input/output device 1316, user interface 1318, memory 1320, storage device 1322, user device interface 1324, eye-tracking sensor 1326 and expression or motion or gesture sensor 1328. Server 1340 further includes server bus 1342, processor 1344, input/output device 1346, memory 1348, storage device 1350, and server interface 1352. In some embodiments, system hardware 1300 can include additional, fewer, or differently arranged components than those illustrated in FIG. 13.

As illustrated in FIG. 13, user device 1310 is electronically coupled to and in bi-directional communication with server 1340, and server 1340 is electronically coupled to and in bi-directional communication with external data source 1330. In some embodiments, user device bus 1312 is electronically coupled to and in bi-directional communication with processor 1314, input/output device 1316, memory 1320, storage device 1322, user device interface 1324, tracking sensor 1326 and motion sensor or gesture sensor 1328. In these embodiments, user interface 1318 is rendered by input/output device 1316. Further to these embodiments, user interface 1318, tracking sensor 1326 and expression or motion or gesture sensor 1328 are configured to interact with user 1332 and receive behavioral information from the user 1332. In these embodiments, user device bus 1312 includes a path that allows components within user device 1310 to communicate with each other. Yet further to these embodiments, server bus 1342 is electronically coupled to and in bi-directional communication with processor 1344, input/output device 1346, memory 1348, storage device 1350, and server interface 1352. In these embodiments, server bus 1342 includes a path that allows components within server 1340 to communicate with each other.

In an embodiment, processor 1314 is implemented as computing hardware component including a central processing unit able to carry out instructions to perform one or more instructions associated with user device 1310. In certain embodiments, processor 1314 can include a microprocessor, an application specific integrated circuit (ASIC), a field programmable object array (FPOA), and the like. Further, processor 1314 interprets and executes instructions retrieved from memory 1320 and storage device 1322. In an embodiment, processor 1314 is configured to interpret and execute instructions associated with the operation of user device 1310. In these embodiments, processor 1344 is implemented as any computing hardware component including a central processing unit able to execute instructions to perform one or more actions associated with server 1340. Still further to these embodiments, processor 1344 can include a microprocessor, an application specific integrated circuit (ASIC), a field programmable object array (FPOA), and the like. In these embodiments, processor 1344 interprets and executes instructions retrieved from memory 1348 and storage device 1350. In an embodiment, processor 1344 is configured to interpret and execute instructions associated with the operation of data input engine, a form server and a tracking module.

In some embodiments, input/output device 1316 is implemented as a computer hardware component that includes peripherals and/or other mechanisms that may enable a user to input information to user device 1310, including keyboards, computer mice, buttons, touch screens, voice recognition, biometric mechanisms, and the like. In these embodiments, input/output device 1316 may be further configured to include one or more mechanisms for outputting information to user 1332, such as, for example displays, light emitting diodes (LEDs), printers, speakers, and the like. Further to these embodiments, input/output device 1316 is implemented to include a computer hardware component able to output data to user 1332 via textual and/or graphical content, such as RSVP text, images, videos, audio, and the like. In these embodiments, input/output device 1316 is further configured to provide content by rendering the content onto user interface 1318 and to receive input from user 1332 via user interface 1318.

In some embodiments memory 1320 is implemented as a computing hardware component that allows the storage and manipulation of data during operations carried out by processor 1314. Memory 1348 allows the storage and manipulation of data during operations associated with server communication, tracking, and/or data processing. Examples of memory 1320 and memory 1348 include random access memory (RAM), read-only memory (ROM), flash memory, and the like.

In some embodiments, storage device 1322 is implemented as a computer hardware component that allows the storage and retrieval of data associated with running one or more modules and executable versions of the one or more modules and is configured to store information and instructions for execution by processor 1314 to control the associated componentry within user device 1310.

In some embodiments, tracking sensor 1326 and/or expression or motion or gesture sensor 1328 is implemented as a computer hardware component configured to track the gaze or movements of user 1332. In these embodiments, the sensor is an eye-tracking sensor 1326 or an expression or gesture sensor 1328 that can be implemented as an optical tracking device, such as an infrared emitter and camera, a video camera, and the like. Eye-tracking sensor 1326 and expression or motion or gesture sensor 1328 are configured to be controlled by an eye-tracking sensor module or motion or gesture sensor module. Further to these embodiments, tracking sensor 1326 and expression or motion or gesture sensor 1328 are sensors that are implemented as a computer hardware component configured to determine one or more movements or desires associated with user 1332. In these embodiments, tracking sensor 1326 and expression or motion or gesture sensor 1328 can be implemented as a motion or gesture tracking device, such as an infrared emitter and camera, a video camera, and the like. Tracking sensor 1326 and expression or motion or gesture sensor 1328 are implemented as a computer hardware component configured to track the position of the user's eyes, hands and head. In these embodiments, eye-tracking-sensor 1326 and expression or motion or gesture sensor 1328 can be implemented as a physical tracking devices, such as an infrared emitter and camera, a video camera and the like.

In some embodiments, data input engine 1330 is implemented as a software application, server, authorized computing device, smartphone, desktop computer, laptop computer, tablet computer, PDA, another type of processor-controlled device that may receive, process, transmit digital data, and the like.

The system may utilize behavioral feedback based on gestures detected by sensor data to provide an instruction to control the movement of a form on a display area of a display of the operator input device. For example, the instruction based on the data may control the display to stop the movement, pause the movement, continue the movement, slow the speed of the movement, increase the speed of the movement, request a new segment, request additional information, input data, or the like.

Figure 14:
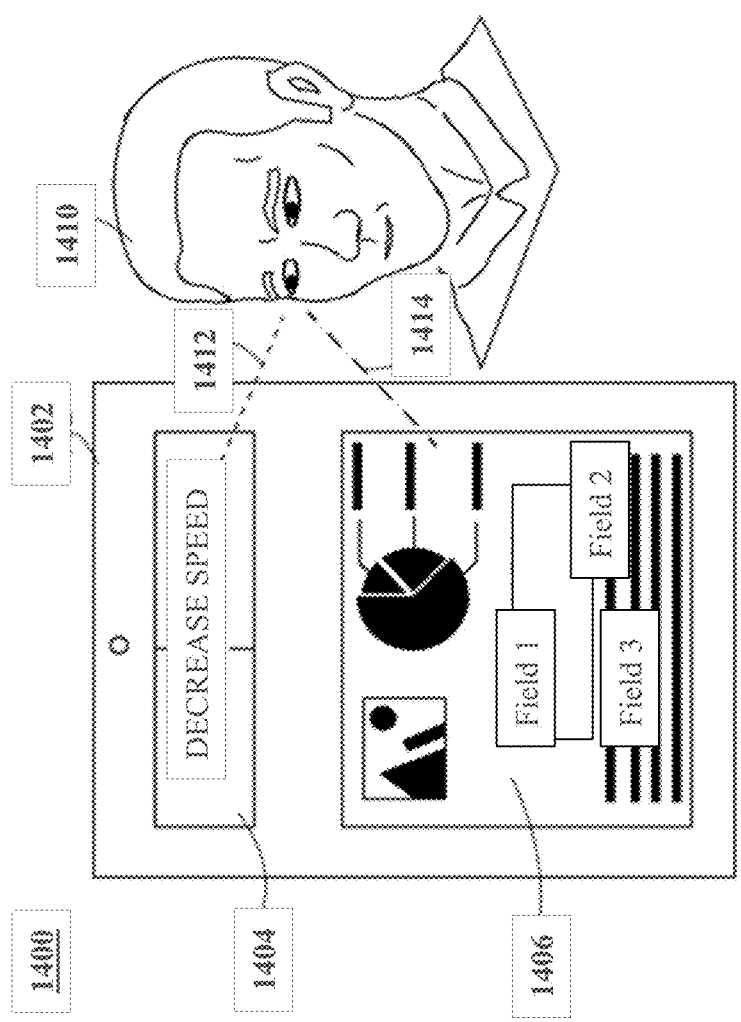
FIG. 14 is a block diagram of an embodiment of the present disclosure including a sensor control device.

FIG. 14 is a block diagram illustrating a first exemplary use case for controlling a data input system by a user based on behavioral feedback, according to an embodiment. In FIG. 14, use case 1400 includes operator input device 1402 and user 1410. In FIG. 14, operator input device 1402 includes control display 1404 and content display 1406.

In some embodiments, the gaze of user 1410 can be characterized by first gaze line 1412 and second gaze line 1414. Use case 1400 can include additional, fewer, or differently arranged components than those illustrated in FIG. 14.

In some embodiments, operator input device 1402 is implemented as a computing device configured to: allow for data input on a display of an operator computing device, collect by a tracking module data of the user sensed by the tracking module, generate a response based on the collected behavior data, and control the display on the operator computing device.

In an embodiment, operator input device 1402 is configured with a control display area 1404 and is implemented on at least a first portion of an operator's interface associated with the operator's device 1402 and configured to display content or forms. Content display 1406 is implemented as a primary portion of an operator's interface associated with user device 1402 and is configured to display content such as forms which may be controlled and manipulated by control display 1404. User device 1402 may be equipped with eye-tracking or motion sensors.

In operation, user device 1402 displays the form. In some embodiments, operator input device 1402 monitors the behavior of user 1410 in order to generate behavioral control data. In an embodiment, a tracking sensor module (not shown) controls a tracking sensor and track the movements of the user 1410 in order to generate behavioral data, and provides the generated sensor data to the tracking module. In some embodiments, user device 1402 responds to the command by adjusting or managing the form scroll on the display 1404 based on the behavioral data. Further to this embodiment, behavioral data is the gaze of user 1410 which is characterized by first gaze line 1412.

In an embodiment, the behavioral engagement data can be assigned a value, a command, or an instruction. Further, the length the user's gaze is directed toward an item or away from the user interface may result in an instruction criteria. For example, if the user is gazing at area of display 1404 for more than one second, the user may wish to pause the scrolling or may wish the scrolling to speed up by a factor of 2 or 4. In another example, if the user is gazing away from area 1404 for more than one second, the user may be requesting a new form. In an embodiment, this threshold value may be set at one second, but any time period can be used. In an embodiment, when the value is above a threshold value, the system can query for additional user input.

In an embodiment, behavioral data is gesture data and the content processing module can assign a state of the user based upon the gesture data. In this embodiment, state is again associated with the form control that is being displayed when the gesture data is captured. The gesture sensor data is analyzed to determine whether any micro-gestures are associated with a particular state, such as a nod, a shake, or a finger movement.

In an embodiment, user device 1402 may detect that user 1410 looks away from the content display 1406 and towards control display 1404, as characterized by second gaze line 1412. In these embodiments, the generated behavioral data is used by user device 1402 to determine that the user wishes to view some other information.

In some embodiments, user device 1402 proceeds to pause the display of content on display 1406. In these embodiments, as user 1410 views content on display 1406, user device 1402 may analyze the behavioral data and detect that user 1410 is seeking instructional input. Further to these embodiments, user device 1402 may then proceed to pause the form display on 1406 and seek input from the user on display 1404.

In an example, user 1410 is processing a life insurance policy form. In this example, the information is displayed to user 1410 via display 1406. As user 1410 process the form, user device 1402 observes user 1410 and determines that user 1410 is looking to control the display 1402. In this embodiment, user device 1402 may generate supplemental instructions for display or may respond directly to the behavioral control.

The systems and methods described herein can address a problem with oversized forms that cannot be fully displayed on a screen. In particular, the process monitors the size of the selected form to be completed and compares it to the displayable area of the operator input device. When the form is too large to legibly display as a whole on the displayable area of an operator input device, the system segments the form into segments sized to fit the displayable area of the operator input device. Each segment may contain fields and text areas. In an embodiment, the system will detect where the fields areas to populate are located on the selected form, and the segments will be limited to those areas containing those fields and only the immediate surrounding text. The segments are sized according to the displayable area of the destined operator input device, and then sent to that operator input device to allow that operator to view and if necessary to fill in the appropriate information in one or more fields.

Avoiding the need to resize the image at the operator input device also provides the advantage of achieving greater efficiency when operating the input device by way of a tracking sensor and/or an expression or motion or gesture sensor. By consistently providing the operator with a legibly viewable image of the relevant portion of the form without requiring the operator to resize or search the image for the appropriate section, the operator will not be distracted or have to strain to read the relevant portion of the form. This can avoid unnecessary actions by the operator such as motion of the eyes, heads, or hands, or making of a facial expression that would otherwise be either necessary or even involuntarily taken by the operator and that could trigger a tracking sensor and/or expression or motion or gesture sensor. Avoiding these actions, can allow for more proficient use of the tracking sensor and/or expression or motion or gesture sensors in the operator input device and thus increase the operator's activity without interruption of the continuous flow of data input.

The system can dynamically monitor the completion of the fields in each segment. The segmentation of the form can be limited to occur only when the form cannot fully be legibly displayed on the displayable area. Segmentation also allows to efficiently provide the relevant portions of the form to automatically become available as a legible image on the intended displayable area of an operator input device. In an embodiment, the portions of an oversized form that does not require action by the operator can be left out of the segments and not forwarded to an operator input device.

As the segment of a form is streamed it can be acted upon, for example, the fields appearing on a segment of a form can be populated by an operator. As the fields are populated, the segment of the form on the displayable area can continue to stream and be replaced by a another segment of the same form or of a different form. For example, in an embodiment, the next segment may be the next portion of the form that has fields to be populated. In an embodiment where different users are tasked to fill out assigned fields appearing on different forms, then the segments can be distributed to the various operators based on the fields contained therein.

The segment of the form with populated fields, in the meantime, can be retrieved and the entered data can be populated into a continuous form or the completed segments can then recompiled into a continuous form.

None of these steps can be performed by the human mind, or by a human using a pen and paper. Instead, the system and method are necessarily rooted in computer technology to overcome a problem specifically arising in the operator interfaces. By permitting the fields and text areas to be dynamically segmented and streamed in accordance with the displayable areas of the operators input units where they will be viewed, the ability of the system and method to display the information from the selected form and interact with the operators are improved. Moreover, in embodiments where different segments are streamed to different operator input devices, the systems and methods described herein also allow for an improved process where multiple users can view the respective relevant portions of the same form in a seamless process.

The systems and methods described herein, also improve the computing and data entry efficiency involved in reviewing and completing forms that are oversized for the available displayable areas of the operator input devices. By segmenting the form to the size of the displayable area and streaming only the segment to a given operator input device, it is possible to greatly reduce the amount of memory, network and processing capacity necessary to send, receive, download, and display the relevant portion of the form at an operator input device. This can increase the speed at which an operator input device can process the information and thus the speed at which an operator can view and complete the relevant portions of a form. For example, in an embodiment where different fields of the same form are to be completed by different operators, the system's ability to dynamically synchronize the distribution of the segments of each form to different operator input devices can greatly increase efficiency at the operators' end who can concentrate only on the portion they view as well as from the computing perspective where less data is being streamed to each operator input device as opposed to streaming the full form each time. Moreover, with the system segmenting the form as described, the segments of the same or different forms can be loaded sequentially as desired at each operator input device, for example, to complete each field. This can allow for a left to right scroll that can lead to increased efficiency from the operator's perspective. This can also increase efficiency by providing a continuous streaming of data by, for example, automatically allow inputting of information from one field to the next within each segment and to automatically scroll from one segment to the next as the fields are populated.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A method for increasing data input and efficiency in a client server network comprising:
   receiving, via an input device coupled to a processor executing an application, a memory, and a display with a display area, a selection of an electronic form comprising a plurality of input fields, from an electronic form data store, whereby the electronic form is loaded into a volatile memory of the client server network;
   determining, via the application executed by the processor, that the electronic form has an associated viewable area that is larger than the display area;
   automatically segmenting, via the application executed by the processor, the selected electronic form into a series of segments corresponding in size to the display area, each segment having at least one input field of the electronic form;
   streaming, via the application executed by the processor, to the display of the input device from the volatile memory, the series of segments of the electronic form in a continuous stream in a direction from a left side of the display to a right side of the display where at least two segments within the series of segments are simultaneously displayed on the display of the input device, wherein each segment within the series of segments is available to receive input associated with the plurality of input fields as the series of segments stream across the display;
   receiving, via the application executed by the processor, inputs associated with the plurality of input fields during the streaming utilizing the input device;
   upon receiving the inputs associated with the plurality of input fields, continuously storing, via the application executed by the processor, the inputs associated with the plurality of input fields as part of the electronic form in the volatile memory; and
   displaying, via the application executed by the processor, a message between at least two segments, the message comprising a completion status of the plurality of input fields based on the inputs received.

2. The method of claim 1 wherein the streaming segments of the electronic form appear to be moving in a horizontal direction.

3. The method of claim 1 wherein a fully viewable segment of the electronic form appears on the left side of the display and moves to the right side of the display.

4. The method of claim 1 wherein the segments are streamed in an order based on a criteria.

5. The method of claim 1 wherein the rate of streaming increases or decreases based on the rate inputs are received.

6. The method of claim 1, wherein saving the stored inputs as part of the electronic form further comprises recompiling the segments into a continuous electronic form.

7. The method of claim 1, further comprising associating an ID to each segment.

8. The method of claim 7, wherein saving the stored inputs as part of the electronic form further comprises recompiling the segments into a continuous electronic form based on the associated ID.

9. The method of claim 1, wherein saving the stored inputs as part of the electronic form further comprises populating the electronic form based on the received inputs.

10. The method of claim 1, wherein each segment comprises at least on field and one text area as they appear on the electronic form.

11. The method of claim 1, wherein segmenting the selected electronic form into segments results in the exclusion of at least one text area of the electronic form from the series of segments.

12. The method of claim 1, further comprising dynamically monitoring completion of the input fields and automatically streaming the segments as the input fields are completed.

13. The method of claim 1, wherein streaming each segment requires less data to be transmitted than what would be required for streaming the electronic form.

14. The method of claim 1, further comprising automatically transitioning an operator cursor from one input field to another as the plurality of input fields are completed.

15. The method of claim 1, wherein streaming the segments of the electronic form comprises scrolling the segments across the display area.

16. The method of claim 15, further comprising automatically transitioning an operator cursor from one input field to another as a segment scrolls across the display area.

17. The method of claim 1 wherein a partially viewable segment of the electronic form appears on the left side of the display, the partially viewable segment becomes a fully viewable segment, and the fully viewable segment moves to the right side of the display.

* * * * *